US012663834B2

(12) United States Patent
Jang

(10) Patent No.: US 12,663,834 B2
(45) Date of Patent: Jun. 23, 2026

(54) ELECTRONIC DEVICE

(71) Applicant: Samsung Display Co., LTD., Yongin-si (KR)

(72) Inventor: Minsok Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 145 days.

(21) Appl. No.: 18/645,675

(22) Filed: Apr. 25, 2024

(65) Prior Publication Data

US 2025/0028367 A1 Jan. 23, 2025

(30) Foreign Application Priority Data

Jul. 18, 2023 (KR) ........................ 10-2023-0093312

(51) Int. Cl.
*G06F 1/16* (2006.01)

(52) U.S. Cl.
CPC .......... *G06F 1/1656* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 9,572,272 B2 | 2/2017 | Lee | |
| 9,786,207 B2 | 10/2017 | Kim et al. | |
| 10,418,425 B2 * | 9/2019 | Park ...................... | G06F 1/1652 |

| | | | |
|---|---|---|---|
| 10,903,436 B2 * | 1/2021 | Shin ...................... | H10K 77/111 |
| 11,330,732 B2 * | 5/2022 | Kim ........................ | C23C 28/44 |
| 11,621,313 B2 * | 4/2023 | Lee ...................... | H10K 59/123 257/680 |
| 11,669,179 B2 | 6/2023 | Shin et al. | |
| 12,189,418 B2 * | 1/2025 | Lee ........................... | G06F 1/16 |
| 12,354,504 B2 * | 7/2025 | Nishio ..................... | C08J 7/046 |
| 2020/0119290 A1 * | 4/2020 | Shin ..................... | H10K 77/111 |
| 2020/0212338 A1 * | 7/2020 | Ha ...................... | H04M 1/0214 |
| 2021/0151699 A1 * | 5/2021 | Shin ...................... | H04M 1/185 |
| 2021/0399076 A1 * | 12/2021 | Lee ...................... | H10K 77/111 |
| 2022/0075470 A1 * | 3/2022 | Shin ...................... | G06F 3/0412 |
| 2022/0184920 A1 * | 6/2022 | Jia ......................... | B32B 27/281 |
| 2022/0209167 A1 | 6/2022 | Park et al. | |
| 2023/0189548 A1 * | 6/2023 | Park ................... | H10K 59/8794 257/40 |
| 2025/0028367 A1 * | 1/2025 | Jang ...................... | G06F 1/1656 |
| 2026/0007034 A1 * | 1/2026 | Park ...................... | H10K 59/40 |

FOREIGN PATENT DOCUMENTS

| | | |
|---|---|---|
| KR | 1020180088157 A | 8/2018 |
| KR | 102210047 B1 | 2/2021 |
| KR | 102366516 B1 | 2/2022 |
| KR | 1020220033656 A | 3/2022 |
| KR | 1020220092212 A | 7/2022 |
| KR | 102484586 B1 | 1/2023 |

* cited by examiner

*Primary Examiner* — Lisa Lea-Edmonds
(74) *Attorney, Agent, or Firm* — CANTOR COLBURN LLP

(57) ABSTRACT

An electronic device includes: a display panel foldable about a virtual folding axis; and a support plate disposed under the display panel and including a porous substrate. The porous substrate includes: a base material including a metal, a first porous film disposed on the base material and including metal oxide, and a second porous film disposed under the base material and including metal oxide.

32 Claims, 23 Drawing Sheets

ELECTRONIC DEVICE

This application claims priority to Korean Patent Application No. 10-2023-0093312 filed on Jul. 18, 2023, and all the benefits accruing therefrom under 35 U.S.C. § 119, the content of which in its entirety is herein incorporated by reference.

BACKGROUND

Embodiments of the present disclosure described herein relate to an electronic device, and more particularly, relate to a flexible electronic device.

An electronic device, such as a smart phone, a digital camera, a notebook computer, a car navigation unit, a smart television, or the like, which provides an image to a user includes a display device for displaying an image. The display device generates an image and provides the image to the user through a display screen.

With the development of display device technology, various forms of display devices are being developed. For example, various display devices that can be curved, folded, or rolled are being developed. The display devices may be easy to carry and may improve user convenience.

A flexible display device may include a flexible display panel and a support plate that is disposed under the display panel and that supports the display panel.

SUMMARY

Embodiments of the present disclosure provide an electronic device with improved reliability for reducing or preventing damage due to an external impact and damage or deformation due to repeated folding operations by improving shear stress, impact resistance, and elastic resilience inside the electronic device.

According to an embodiment, an electronic device includes: a display panel foldable about a virtual folding axis and a support plate that is disposed under the display panel and that includes a porous substrate. The porous substrate includes: a base material including a metal, a first porous film that is disposed on the base material and that includes metal oxide, and a second porous film that is disposed under the base material and that includes metal oxide.

Each of the metal oxide included in the first porous film and the metal oxide included in the second porous film may be oxide of the metal included in the base material.

The first porous film and the second porous film may be formed through an anodizing process.

Each of pores in the first porous film and pores in the second porous film may have a pillar shape extending in a thickness direction in a sectional view.

The porous substrate may further include a third porous film disposed between the base material and the first porous film and a fourth porous film disposed between the base material and the second porous film. The third porous film may have a lower porosity than the first porous film, and the fourth porous film may have a lower porosity than the second porous film.

The third porous film may have a higher hardness than the first porous film, and the fourth porous film may have a higher hardness than the second porous film.

Each of the metal oxide included in the first porous film and the metal oxide included in the second porous film may be oxide of the metal included in the base material, and each of the third porous film and the fourth porous film may include the oxide of the metal included in the base material.

The first to fourth porous films may be formed through a plasma electrolytic oxidation process.

Each of pores in the first porous film, pores in the second porous film, pores in the third porous film, and pores in the fourth porous film may have a pillar shape extending in a thickness direction in a sectional view.

The metal included in the base material may include one of aluminum, magnesium, and titanium.

The support plate may further include first sealing agents, which fill pores in the first porous film and second sealing agents, which fill pores in the second porous film.

Each of the first sealing agents and the second sealing agents may include one of a dye and an elastic material.

The support plate may further include: a first cover substrate disposed on the first porous film and a second cover substrate disposed under the second porous film, and each of the first cover substrate and the second cover substrate may include a metal.

Each of the first cover substrate and the second cover substrate may include stainless steel ("SUS").

The support plate may further include: a first adhesive support layer disposed between the first cover substrate and the first porous film and a second adhesive support layer disposed between the second cover substrate and the second porous film.

The display panel may include: a folding region foldable about the folding axis and a first non-folding region and a second non-folding region spaced apart from each other in a second direction crossing the first direction with the folding region therebetween.

The support plate may include: a first support part that overlaps the first non-folding region, a second support part that overlaps the second non-folding region, and a third support part that overlaps the folding region, and the third support part may define openings penetrating the support plate from a front surface of the support plate to a rear surface of the support plate.

The openings may be arranged in a grid form in a plan view.

The support plate may include a first support part that overlaps the first non-folding region, a second support part that overlaps the second non-folding region, and a third support part that overlaps the folding region, and the third support part may define grooves on a rear surface of the support plate.

The support plate may further include a filling member including an elastic material. The porous substrate may be provided in plurality, and the plurality of porous substrates may include a first plate that overlaps the first non-folding region and a second plate that overlaps the second non-folding region and spaced apart from the first plate. The filling member may overlap the folding region and may be disposed between the first plate and the second plate.

The support plate may further include: a first sealing layer disposed on the first porous film and covering the first porous film; and a second sealing layer disposed under the second porous film and covering the second porous film, and each of the first sealing layer and the second sealing layer may include an elastic material.

The support plate may include a first support part that overlaps the first non-folding region, a second support part that overlaps the second non-folding region, and a third support part that overlaps the folding region, and the third support part may overlap an entirety of the folding region.

The electronic device may further include a first lower plate that is disposed under the support plate and that overlaps the first non-folding region and one portion of the folding region and a second lower plate that is disposed under the support plate and that overlaps the second non-folding region and another portion of the folding region, the second lower plate being spaced apart from the first lower plate. Each of the first lower plate and the second lower plate may include: a lower base material including a metal, a fifth porous film that is disposed on the lower base material and that includes metal oxide, and a sixth porous film that is disposed under the lower base material and that includes metal oxide.

The fifth porous film and the sixth porous film may be formed through an anodizing process.

Each of the first lower plate and the second lower plate may further include: a seventh porous film disposed between the lower base material and the fifth porous film and an eighth porous film disposed between the lower base material and the sixth porous film, and the fifth to eighth porous films may be formed through a plasma electrolytic oxidation process.

The seventh porous film may have a higher hardness than the fifth porous film, and the eighth porous film may have a higher hardness than the sixth porous film.

Each of the first lower plate and the second lower plate may further include: a third cover substrate disposed on the fifth porous film and a fourth cover substrate disposed under the sixth porous film, and each of the third cover substrate and the fourth cover substrate may include a metal.

Each of the first lower plate and the second lower plate may further include: a first lower adhesive layer disposed between the third cover substrate and the fifth porous film and a second lower adhesive layer disposed between the fourth cover substrate and the sixth porous film.

The electronic device may further include: an electronic module disposed under the display panel and at least partially inserted into a hole defined in the support plate.

According to an embodiment, an electronic device includes: a display panel foldable about a virtual folding axis and a support plate that is disposed under the display panel and that includes a porous substrate. The porous substrate includes: a base material including a metal, a first oxide film disposed on the base material and defining first pores therein, and a second oxide film disposed under the base material and defining second pores therein.

The first oxide film and the second oxide film may be formed through an anodizing process.

The porous substrate may further include: a third oxide film disposed between the base material and the first oxide film and defining third pores therein and a fourth oxide film disposed between the base material and the second oxide film and defining fourth pores therein. The third oxide film may have a lower porosity than the first oxide film, and the fourth oxide film may have a lower porosity than the second oxide film.

The first to fourth oxide films may be formed through a plasma electrolytic oxidation process.

BRIEF DESCRIPTION OF THE FIGURES

The above and other aspects and features of the present disclosure will become apparent by describing in detail embodiments thereof with reference to the accompanying drawings.

FIG. 10A is a sectional view of the support plate according to an embodiment of the present disclosure.

Figure 17:
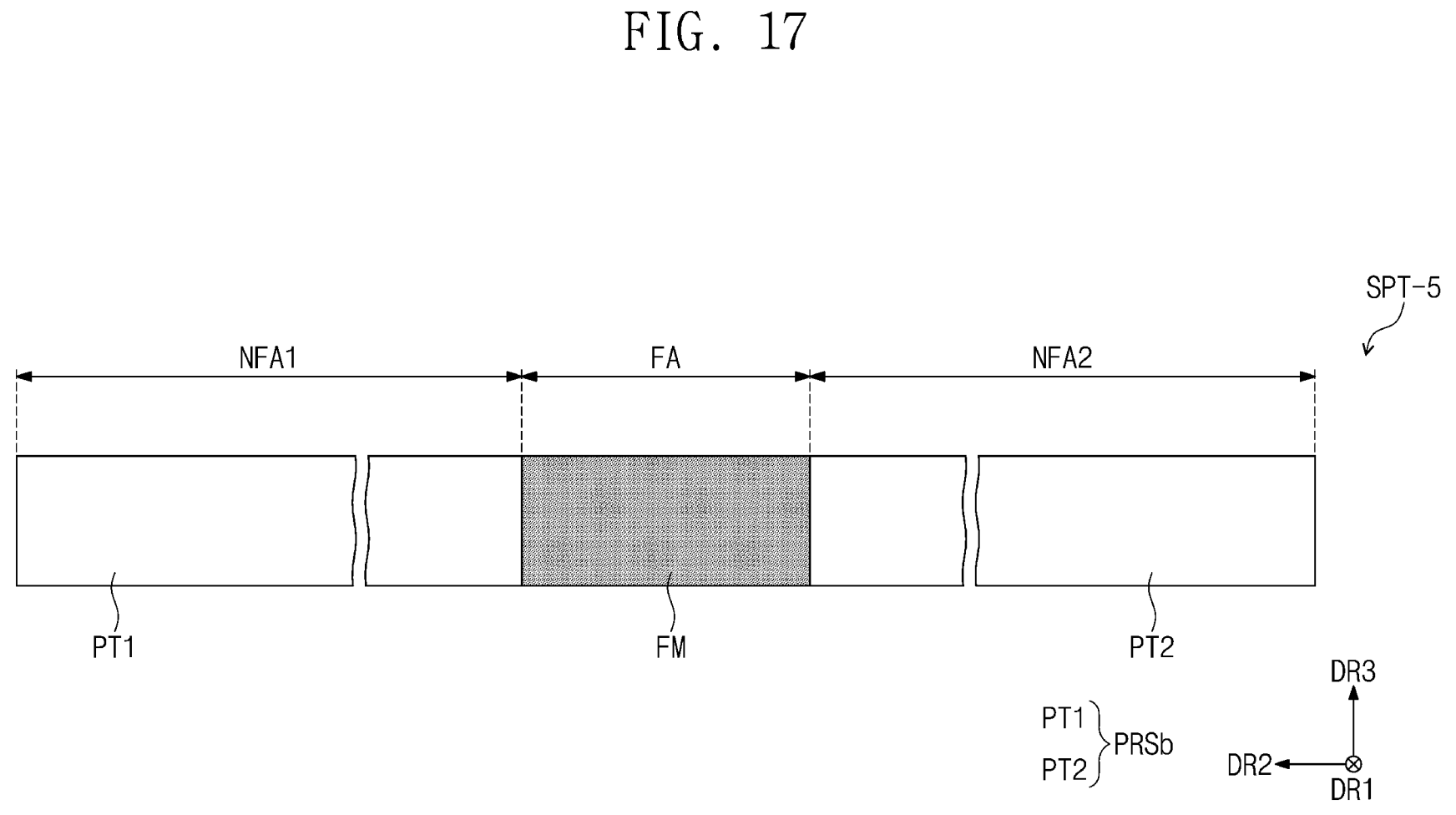

FIG. 17 is a sectional view of a support plate according to still another embodiment of the present disclosure.

DETAILED DESCRIPTION

Figure 1:
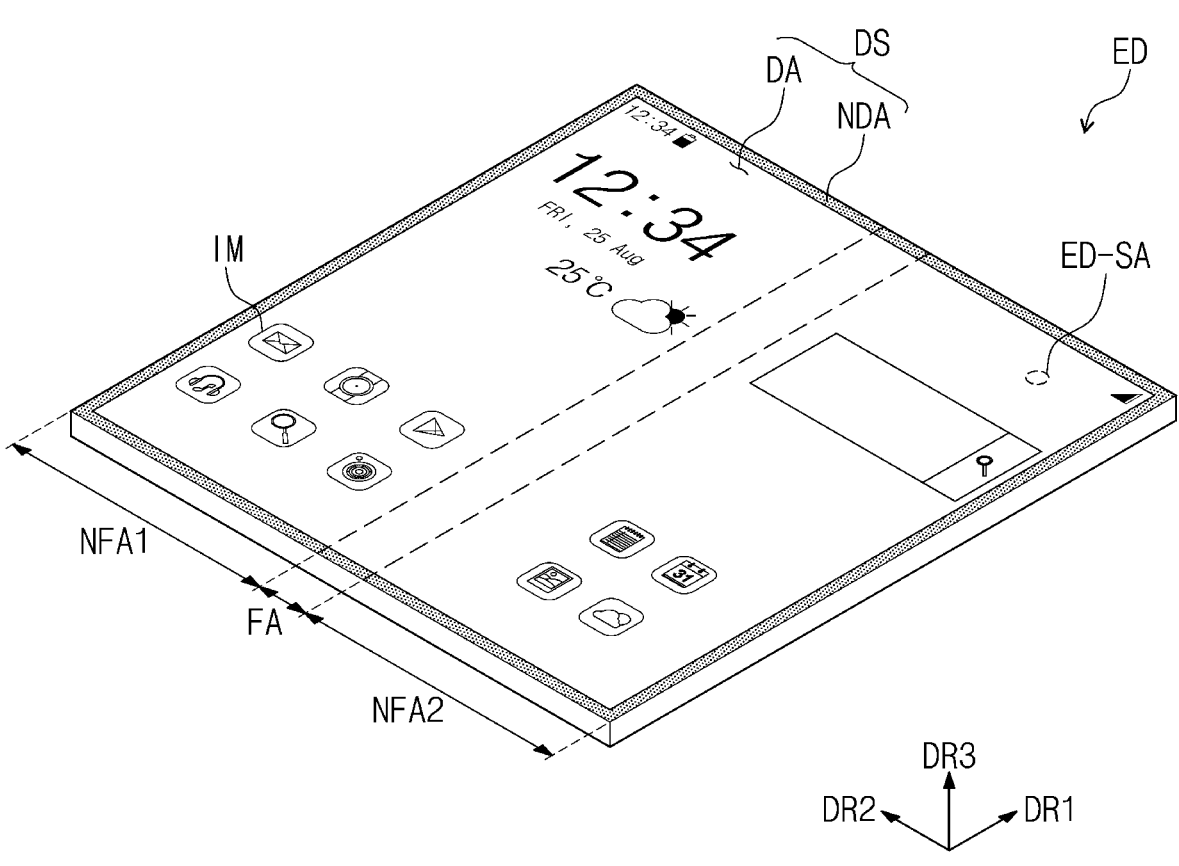
FIG. 1 is a perspective view of an electronic device according to an embodiment of the present disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. The terminology used herein is for the purpose of describing particular embodiments only and is not intended to be limiting. As used herein, "a", "an", "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes all of one or more combinations defined by related components.

Terms such as "first", "second", and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

FIG. 1 is a perspective view of an electronic device according to an embodiment of the present disclosure.

Referring to FIG. 1, the electronic device ED according to an embodiment of the present disclosure may have a rectangular shape with long sides extending in a first direction DR1 and short sides extending in a second direction DR2 crossing the first direction DR1. However, without being limited thereto, the electronic device ED may have various shapes such as a circular shape, a polygonal shape, and the like. The electronic device ED may be a flexible display device.

Hereinafter, a direction substantially perpendicular to a plane defined by the first direction DR1 and the second direction DR2 is defined as a third direction DR3. In addition, the expression "from above the plane" used herein may mean that it is viewed in the third direction DR3 (i.e., a plan view).

The electronic device ED may include a folding region FA and a plurality of non-folding regions NFA1 and NFA2. The non-folding regions NFA1 and NFA2 may include the first non-folding region NFA1 and the second non-folding region NFA2. The folding region FA may be disposed between the first non-folding region NFA1 and the second non-folding region NFA 2. The first non-folding region NFA1, the folding region FA, and the second non-folding region NFA 2 may be arranged in the second direction DR2. The folding region FA may be referred to as a foldable region, and the first and second non-folding regions NFA1 and NFA 2 may be referred to as first and second non-foldable regions.

Although one folding region FA and two non-folding regions NFA 1 and NFA2 are illustrated as an example in FIG. 1, the number of folding regions FA and the number of non-folding regions NFA1 and NFA2 are not limited thereto. For another example, the electronic device ED may include more than two non-folding regions and a plurality of folding regions, each of which is disposed between the non-folding regions.

An upper surface of the electronic device ED may be defined as a display surface DS, and the display surface DS may have a plane defined by the first direction DR1 and the second direction DR2. Images IM generated by the electronic device ED may be provided to a user through the display surface DS.

The display surface DS may include a display region DA and a non-display region NDA around the display region DA. The display region DA may display an image, and the non-display region NDA may not display an image. The non-display region NDA may surround the display region DA and may define a border of the electronic device ED that is printed in a predetermined color.

A sensor region ED-SA may be defined in the display region DA of the electronic device ED. Although one sensor region ED-SA is illustrated as an example in FIG. 1, the number of sensor regions ED-SA is not limited thereto. The sensor region ED-SA may be a portion of the display region DA. Accordingly, the electronic device ED may display an image through the senor region ED-SA. However, the present disclosure is not limited thereto. For another example, a portion of a display panel that corresponds to the sensor region ED-SA may be removed, and the sensor region ED-SA may not display an image.

An electronic module may be disposed in a region overlapping the sensor region ED-SA. The electronic module may receive an external input transferred through the sensor region ED-SA, or may provide an output through the sensor region ED-SA. In an embodiment, for example, the electronic module may be a camera module, a sensor (e.g., a proximity sensor) that measures a distance, a sensor that recognizes a part of the user's body (e.g., a fingerprint, an iris, or a face), or a small lamp that outputs light, but is not particularly limited thereto. Hereinafter, it will be exemplified that the electronic module overlapping the sensor region ED-SA is a camera module.

Figure 2:
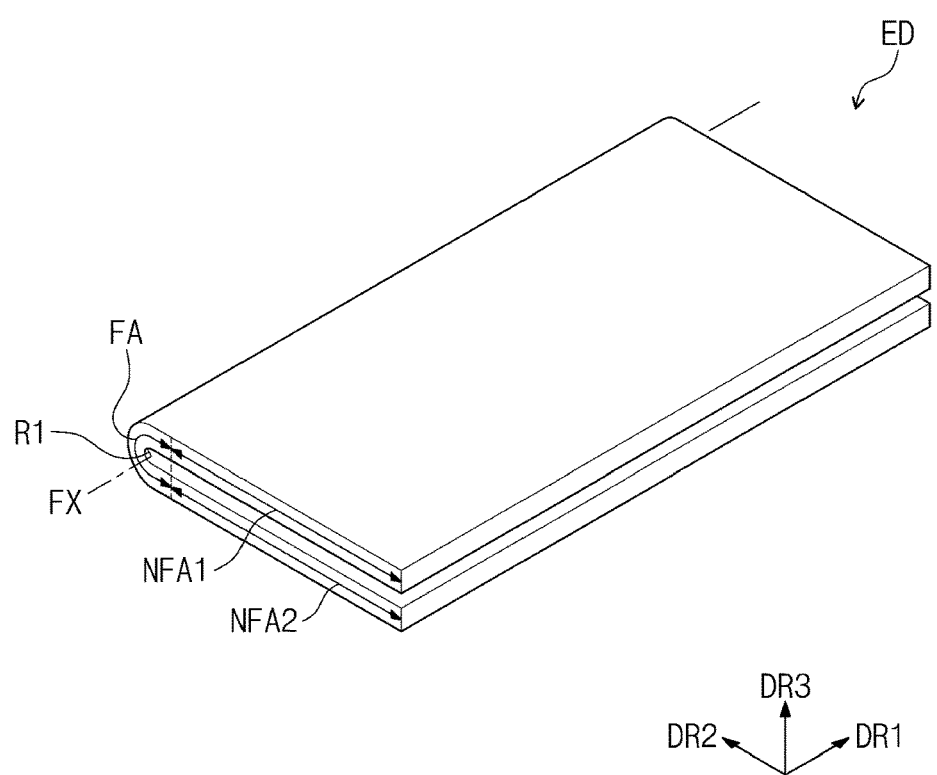
FIGS. 2 and 3 are perspective views of the folded electronic device according to an embodiment of the present disclosure.
Figure 3:
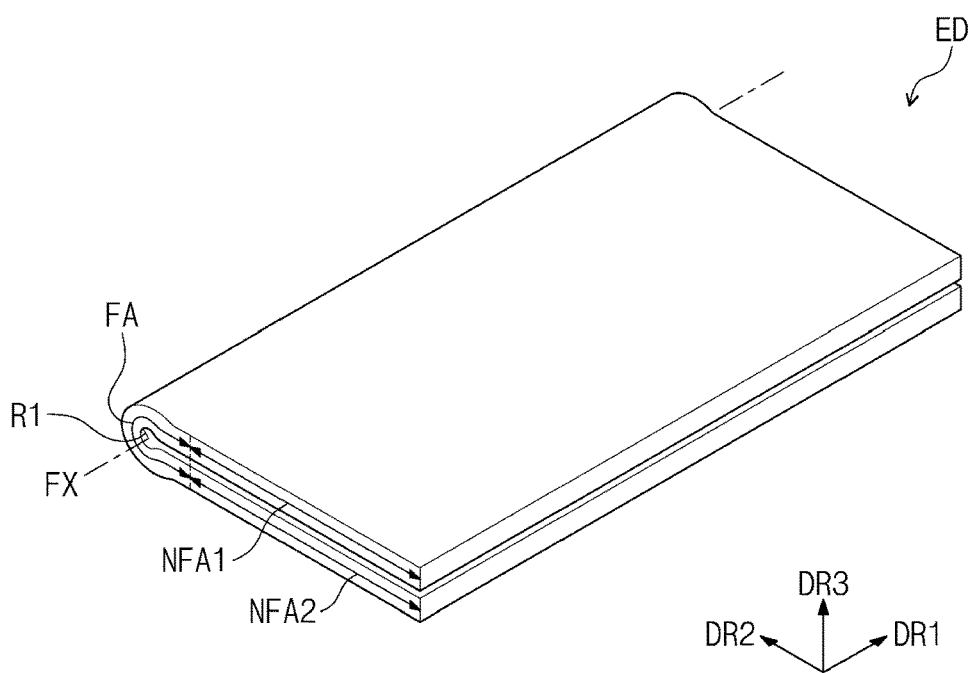

FIGS. 2 and 3 are perspective views of the folded electronic device according to an embodiment of the present disclosure. FIGS. 2 and 3 illustrate folded states of the electronic device illustrated in FIG. 1.

Referring to FIGS. 2 and 3, the electronic device ED may be a foldable electronic device ED that is folded or unfolded. In an embodiment, for example, the folding region FA may be bent about a virtual folding axis FX parallel to the first direction DR1, and the electronic device ED may be folded accordingly. The folding axis FX may be defined as a long axis parallel to the long sides of the electronic device ED.

When the electronic device ED is folded, the first non-folding region NFA1 and the second non-folding region NFA 2 may face each other, and the electronic device ED may be folded in an in-folding manner such that the display surface DS is not exposed to the outside. However, embodiments of the present disclosure are not limited thereto. For another example, the electronic device ED may be folded about the folding axis FX in an out-folding manner such that the display surface DS is exposed to the outside.

The folding region FA may be bent to have a radius of curvature R1. As illustrated in FIG. 2, the distance between the first non-folding region NFA1 and the second non-folding region NFA2 may be substantially the same as twice the radius of curvature R1 (e.g., the diameter). In this case, the electronic device ED may be folded in the shape of "U".

However, without being limited thereto, as illustrated in FIG. 3, the distance between the first non-folding region NFA1 and the second non-folding region NFA2 may be less than twice the radius of curvature R1. In this case, the electronic device ED may be folded in a dumbbell shape.

Figure 4:
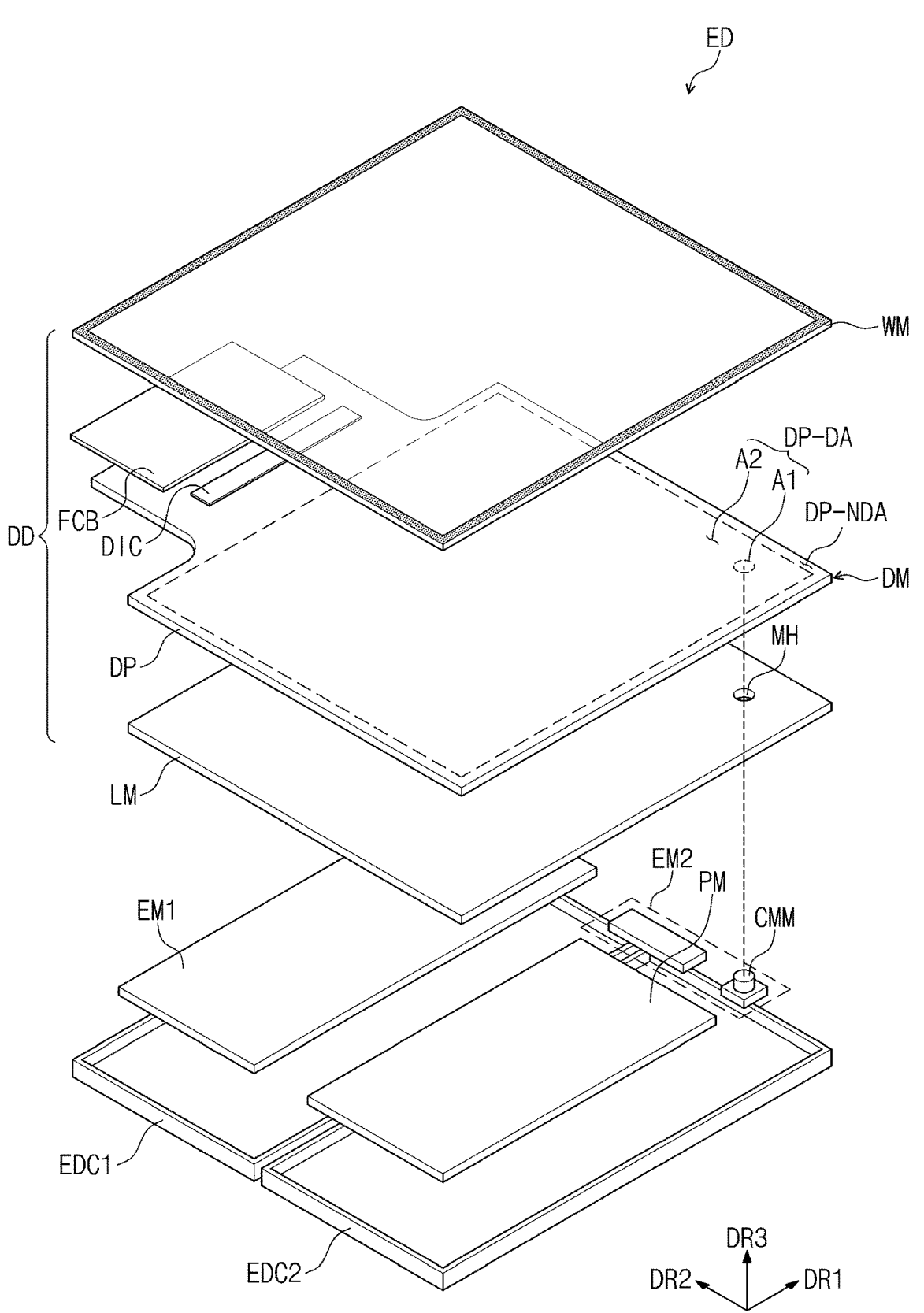
FIG. 4 is an exploded perspective view of the electronic device according to an embodiment of the present disclosure.
Figure 5:
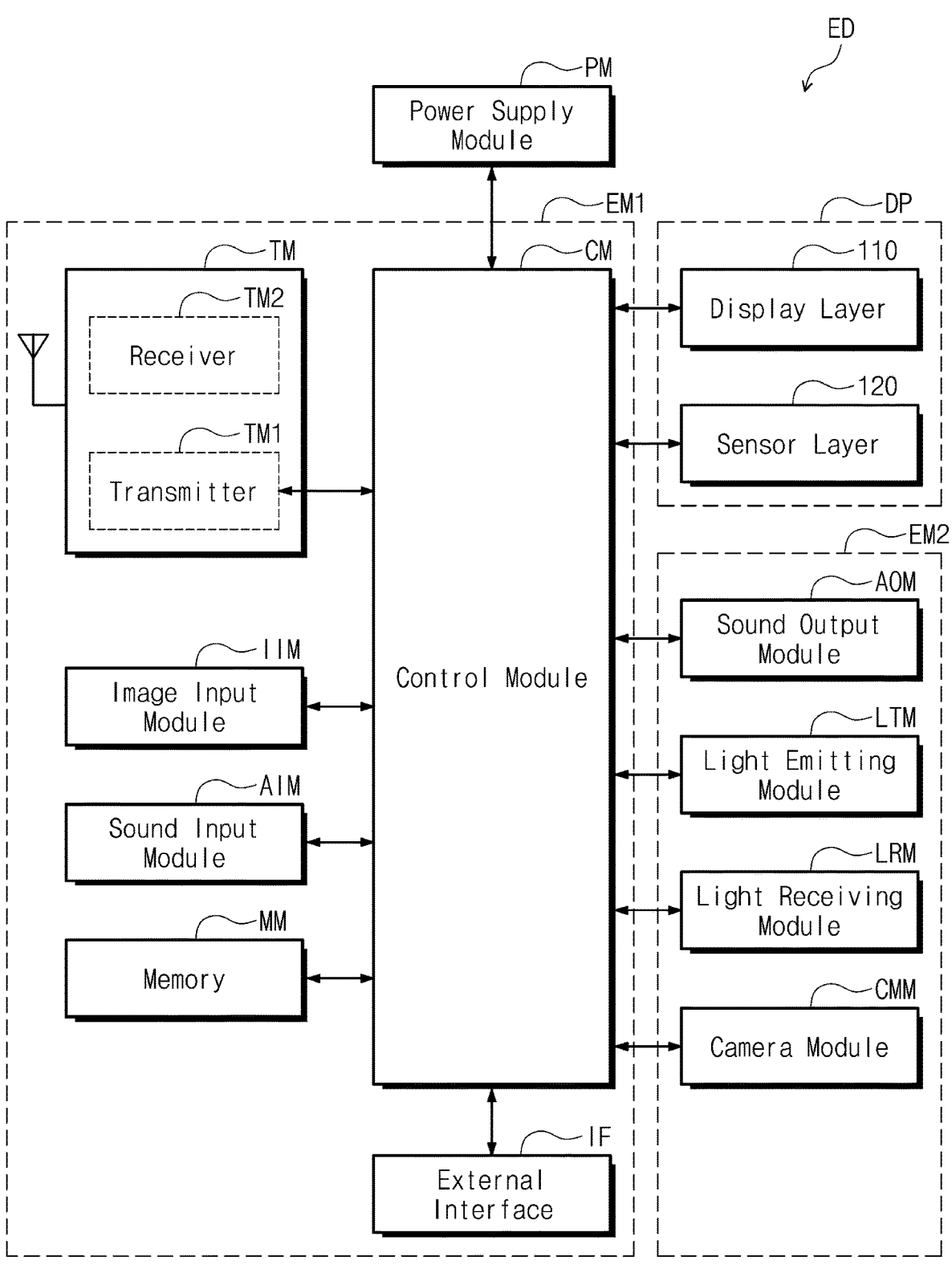
FIG. 5 is a block diagram of the electronic device according to an embodiment of the present disclosure.

FIG. 4 is an exploded perspective view of the electronic device according to an embodiment of the present disclosure. FIG. 5 is a block diagram of the electronic device according to an embodiment of the present disclosure.

Referring to FIGS. 4 and 5, the electronic device ED may include a display device DD, a first electronic module EM1, a second electronic module EM2, a power supply module PM, and housings EDC1 and EDC2. Although not separately illustrated, the electronic device ED may further include a mechanical structure (e.g., a hinge) for controlling a folding operation of the display device DD.

The display device DD may include a window module WM, a display module DM, and a lower module LM. The window module WM may provide a front surface of the electronic device ED. The window module WM may be disposed on the display module DM and may protect the display module DM. The window module WM may transmit light generated from the display module DM and may provide the light to the user.

The display module DM may include at least a display panel DP. The display module DM generates an image and detects an external input. In FIG. 4, the display module DM is illustrated as being the same as the display panel DP. However, the display module DM may substantially be a stacked structure in which multiple components including the display panel DP are stacked. The stacked structure of the display module DM will be described below in detail.

The display panel DP may generate an image. The display panel DP may include a display region DP-DA and a non-display region DP-NDA that correspond to the display region DA (refer to FIG. 1) and the non-display region NDA (refer to FIG. 1) of the electronic device ED, respectively. The display region DP-DA may generate an image, and the non-display region DP-NDA may not generate an image. The expression "one region/portion corresponds to another region/portion" used herein means that the regions/portions overlap each other and is not limited to having the same area.

The display region DP-DA may include a first region A1 and a second region A2. The first region A1 may overlap, or correspond to, the sensor region ED-SA (refer to FIG. 1A) of the electronic device ED. Although the first region A1 is illustrated in a circular shape in this embodiment, the first region A1 may have various shapes, such as a polygonal shape, an oval shape, a shape having at least one curved side, or an irregular shape, and is not limited to any one embodiment. The first region A1 may be referred to as a component region, and the second region A2 may be referred to as a main display region or a normal display region.

The first region A1 may have a higher transmittance than the second region A2. Alternatively, the first region A1 may have a lower resolution than the second region A2. However, the present disclosure is not limited thereto. For another example, the first region A1 may have a higher transmittance than the second region A2, but may have substantially the same resolution as the second region A2. The first region A1 may overlap a camera module CMM to be described below. In an embodiment of the present disclosure, a portion of the display panel DP that corresponds to the first region A1 may be removed. Accordingly, an image may not be displayed on the first region A1.

The display panel DP may include a display layer 110 and a sensor layer 120.

The display layer 110 may be a component that substantially generates an image. The display layer 110 may be an emissive display layer. In an embodiment, for example, the display layer 110 may be an organic light emitting display layer, an inorganic light emitting display layer, an organic-inorganic light emitting display layer, a quantum-dot display layer, a micro-LED display layer, or a nano-LED display layer.

The sensor layer 120 may sense an external input applied from the outside. The external input may be a user input. The user input may include various types of external inputs, such as a part of the user's body, light, heat, a pen, or pressure.

The display module DM may include a driver IC DIC disposed on the non-display region DP-NDA. The display module DM may further include a flexible circuit film FCB coupled to the non-display region DP-NDA.

The driver IC DIC may include drive elements (e.g., a data drive circuit) for driving pixels of the display panel DP. Although FIG. 4 illustrates the structure in which the driver IC DIC is mounted on the display panel DP, the present disclosure is not limited thereto. For another example, the driver IC DIC may be mounted on the flexible circuit film FCB.

The lower module LM may be disposed under the display module DM. The lower module LM may be a component that supports the display module DM. The lower module ML may have a module hole MH defined therein. The module hole MH may correspond to a hole penetrating the lower module LM. Although the lower module LM is briefly illustrated as a single component, the lower module LM may be a stacked structure in which multiple components are stacked. The module hole MH may be defined to penetrate the multiple components of the lower module LM. The module hole MH may overlap the first region A1 of the display region DP-DA. The stacked structure of the lower module LM will be described below in detail.

The power supply module PM supplies power for overall operation of the electronic device ED. The power supply module PM may include a conventional battery module.

The first electronic module EM1 and the second electronic module EM2 include various functional modules for operating the electronic device ED. The first electronic module EM1 and the second electronic module EM2 may be directly mounted on a mother board electrically connected with the display panel DP, or may be mounted on separate substrates and may be electrically connected to the mother board through connectors (not illustrated).

The first electronic module EM1 may include a control module CM, a wireless communication module TM, an image input module IIM, a sound input module AIM, a memory MM, and an external interface IF.

The control module CM controls overall operation of the electronic device ED. The control module CM may be a microprocessor. In an embodiment, for example, the control module CM activates or deactivates the display panel DP. The control module CM may control other modules, such as the image input module IIM or the sound input module AIM, based on a touch signal received from the display panel DP.

The wireless communication module TM may communicate with an external electronic device through a first network (e.g., a short-range communication network such as Bluetooth, WiFi direct, or infrared data association ("IrDA")) or a second network (e.g., a long-range communication network such as a cellular network, Internet, or a computer network (e.g., "LAN" or "WAN")). Communication modules included in the wireless communication module TM may be integrated into one component (e.g., a single chip), or may be implemented with a plurality of components (e.g., a plurality of chips) separated from one another.

The wireless communication module TM may transmit/receive sound signals using a general communication line. The wireless communication module TM may include a transmitter TM1 that modulates a signal to be transmitted and transmits the modulated signal and a receiver TM2 that demodulates a received signal.

The image input module IIM processes an image signal to covert the image signal into image data that can be displayed on the display panel DP. The sound input module AIM receives an external sound signal through a microphone in a voice recording mode or a voice recognition mode and converts the external sound signal into electrical voice data.

The external interface IF may include a connector capable of physically connecting the electronic device ED and an external electronic device. In an embodiment, for example, the external interface IF serves as an interface connected to an external charger, a wired/wireless data port, or a card (e.g., memory card or SIM/UIM card) socket.

The second electronic module EM2 may include a sound output module AOM, a light emitting module LTM, a light receiving module LRM, and the camera module CMM. The sound output module AOM converts sound data received from the wireless communication module TM or sound data stored in the memory MM and outputs the converted data to the outside.

The light emitting module LTM generates and outputs light. The light emitting module LTM may output infrared light. The light emitting module LTM may include an LED element. The light receiving module LRM may sense infrared light. The light receiving module LRM may be activated when infrared light above a predetermined level is sensed. The light receiving module LRM may include a CMOS sensor. After infrared light generated by the light emitting module LTM is output, the infrared light may be reflected by an external object (e.g., the user's finger or face), and the reflected infrared light may be incident to the light receiving module LRM.

The camera module CMM may take a still image and a video. The camera module CMM may include a plurality of camera modules CMM. A part of the camera modules CMM may overlap the first region A1. At least a portion of the camera module CMM overlapping the first region A1 may be inserted into the module hole MH. An external input (e.g., light) may be provided to the camera module CMM through the first region A1. In an embodiment, for example, the camera module CMM may take an external image by receiving natural light through the first region A1.

The housings EDC1 and EDC2 may accommodate the display module DM, the lower module ML, the first and second electronic modules EM1 and EM2, and the power supply module PM. The housings EDC1 and EDC2 protect components, such as the display module DM, the lower module LM, the first and second electronic modules EM1 and EM2, and the power supply module PM, which are accommodated in the housings EDC1 and EDC2. Although the two housings EDC1 and EDC2 separated from each other are illustrated in FIG. 4, the present disclosure is not limited thereto. Although not illustrated, the electronic device ED may further include a hinge structure for connecting the two housings EDC1 and EDC2 in another embodiment. The housings EDC1 and EDC2 may be coupled with the window module WM.

Figure 6:
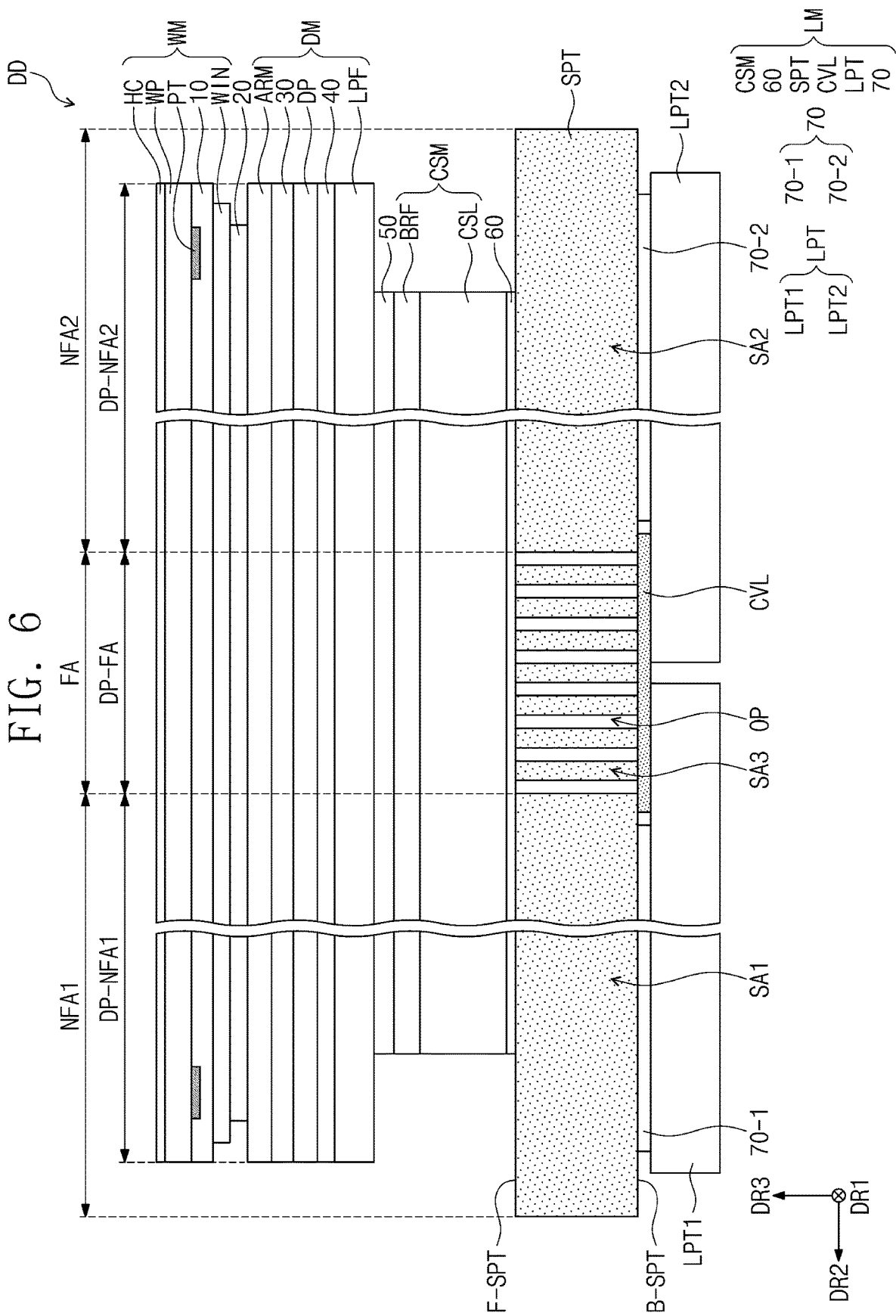
FIG. 6 is a sectional view illustrating a display device according to an embodiment of the present disclosure.
Figure 7:
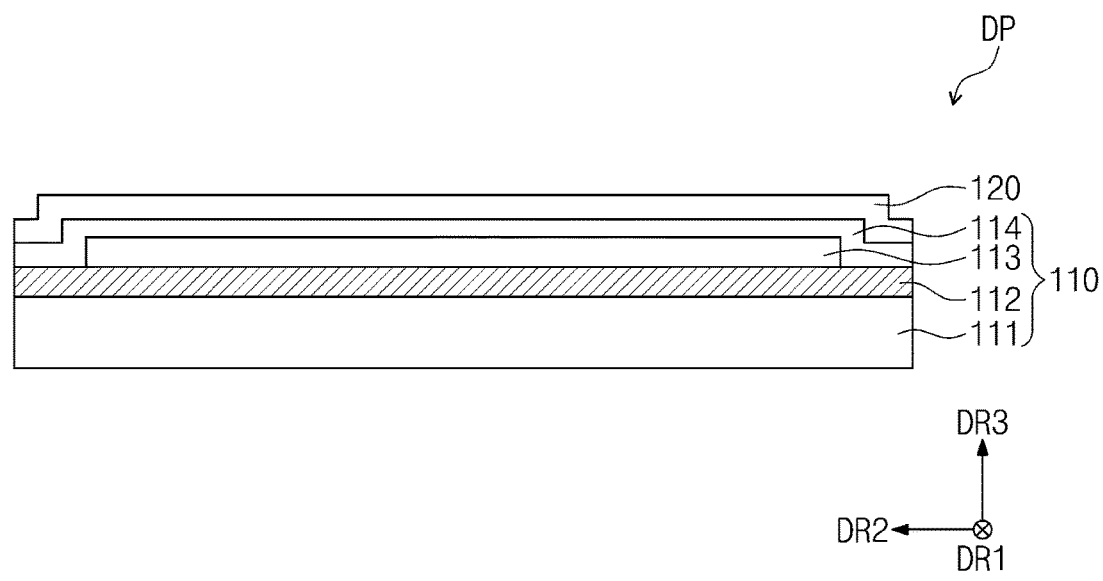
FIG. 7 is a sectional view of a display panel according to an embodiment of the present disclosure.
Figure 8:
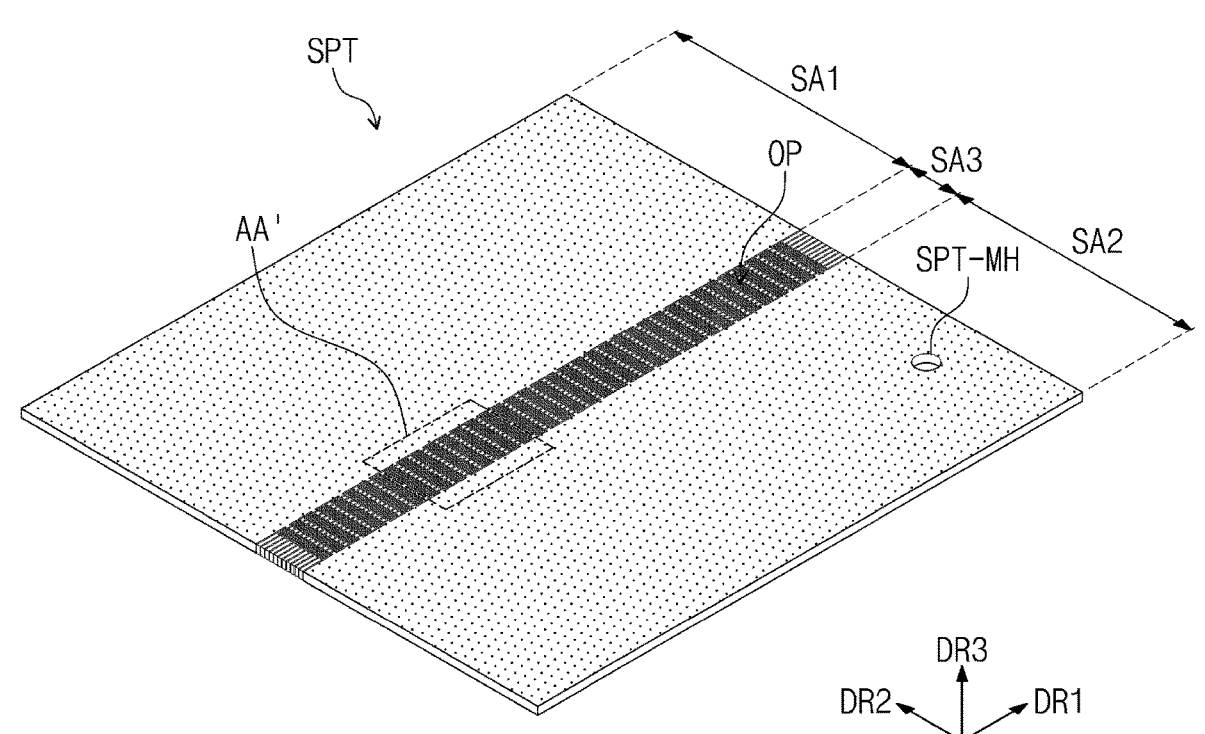
FIG. 8 is a perspective view of a support plate according to an embodiment of the present disclosure.
Figure 9:
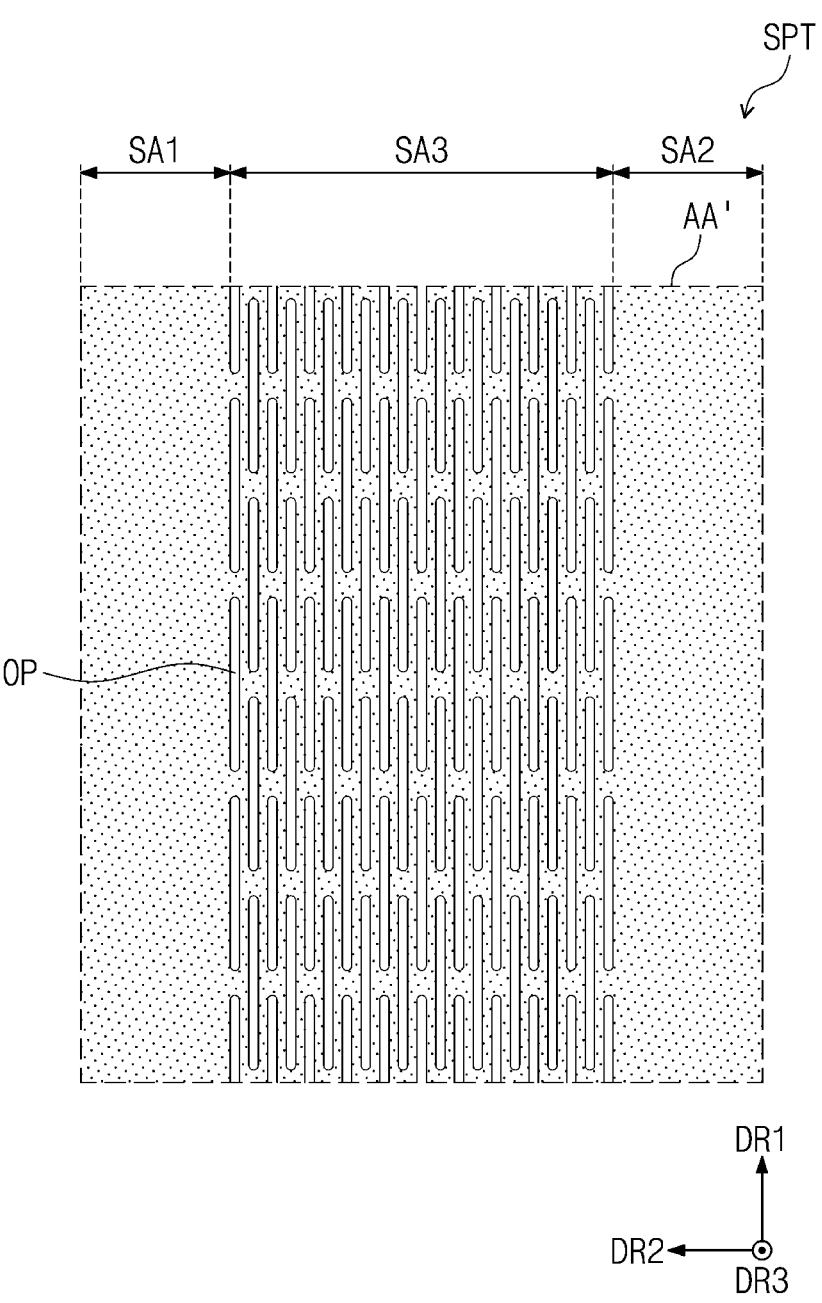
FIG. 9 is an enlarged plan view of region AA' of FIG. 8.

FIG. 6 is a sectional view illustrating the display device according to an embodiment of the present disclosure. As used herein, the "sectional view" is a view of an object cut by a plane (e.g., second and third directions DR2 and DR3) parallel to the thickness direction (i.e., third direction DR3)

of the display panel DP. FIG. 7 is a sectional view of the display panel according to an embodiment of the present disclosure. FIG. 8 is a perspective view of a support plate according to an embodiment of the present disclosure. FIG. 9 is an enlarged plan view of region AA' of FIG. 8. In FIG. 6, a section of the display device DD viewed in the first direction DR1 is illustrated. As used herein, the "plan view" is a view in the thickness direction (i.e., third direction DR3) of the display panel DP. For convenience of description, the protruding portion of the display panel DP on which the driver IC DIC illustrated in FIG. 4 is disposed and the flexible circuit film FCB connected to the protruding portion of the display panel DP are omitted in FIG. 6.

Referring to FIG. 6, the display device DD may include the window module WM, the display module DM, the lower module LM, and adhesive layers 20 and 50. The display device DD may include a first non-folding region NFA1, a second non-folding region NFA2, and a folding region FA. The first non-folding region NFA1, the second non-folding region NFA2, and the folding region FA of the display device DD may correspond to the first non-folding region NFA1, the second non-folding region NFA2, and the folding region FA of the electronic device ED described above with reference to FIG. 1.

The window module WM may include a window WIN, a window protection layer WP, a hard coating layer HC, a bezel pattern PT, and a first adhesive layer 10.

The window WIN may be disposed on the display module DM. The window WIN may protect the display module DM from external impacts or scratches. The window WIN may include an optically clear material. In an embodiment, for example, the window WIN may include glass or a synthetic resin film.

The window WIN may have a single-layer structure or a multi-layer structure. In an embodiment, for example, the window WIN may include a plurality of synthetic resin films coupled by an adhesive, or may include a glass film and a synthetic resin film coupled by an adhesive.

The window protection layer WP may be disposed on the window WIN. The first adhesive layer 10 may be disposed between the window WIN and the window protection layer WP and may couple the window WIN and the window protection layer WP. The first adhesive layer 10 may be a pressure sensitive adhesive ("PSA") film or an optically clear adhesive ("OCA") member. Adhesive layers to be described below may also be the same as the first adhesive layer 10 and may include a conventional adhesive. However, without being limited thereto, the first adhesive layer 10 may be omitted, and the window protection layer WP may be directly disposed on the window WIN.

The window protection layer WP may include an organic material. In an embodiment, for example, the window protection layer WP may include at least one of polyimide, polycarbonate, polyamide, polymethylmethacrylate, polyethylene terephthalate, triacetyl cellulose, thermoplastic polyurethane ("TPU"), thermoset polyurethane ("TSU"), polyether block amide ("PEBA"), and copolyester thermoplastic elastomer ("COPE"). However, the material of the window protection layer WP is not limited to the aforementioned examples.

The hard coating layer HC may be disposed on the window protection layer WP. The hard coating layer HC may be disposed at the top of the window module WM. The hard coating layer HC may be directly coated on an upper surface of the window protection layer WP. However, without being limited thereto, the hard coating layer HC may be coupled to the window protection layer WP through a separate adhesive.

The hard coating layer HC may include a hard coating agent including at least one of an organic composition, an inorganic composition, and an organic-inorganic composite composition. In an embodiment, for example, the hard coating layer HC may include an acrylic compound, an epoxy compound, a siloxane-based compound, or a urethane-based compound. The hard coating layer HC may improve the durability of the window module WM, may prevent scratches caused by external factors, and may provide a flat upper surface.

The hard coating layer HC may further include an additional functional layer such as an anti-fingerprint layer, an anti-static layer, or an anti-contamination layer. However, without being limited thereto, the hard coating layer HC may be provided as a single layer and may further include functional materials such as an anti-fingerprint coating agent such as a fluorine-containing compound, an anti-reflection agent, or an anti-glare agent.

The bezel pattern PT may be disposed on a lower surface of the window protection layer WP. However, the position in which the bezel pattern PT is formed is not limited thereto, and the bezel pattern PT may be disposed on an upper or lower surface of the window WIN in another embodiment. The bezel pattern PT may be adjacent to the periphery of the window protection layer WP. The region where the bezel pattern PT is disposed may correspond to the non-display region DP-NDA (refer to FIG. 4) of the display panel DP. The bezel pattern PT may correspond to a layer formed by coating or printing a material having a color. The bezel pattern PT may prevent components of the display module DM disposed to overlap the bezel pattern PT in a plan view from being visible from the outside.

The second adhesive layer 20 may be disposed between the window module WM and the display module DM and may couple the window module WM and the display module DM.

The display module DM may include an anti-reflection member ARM, the display panel DP, a lower protective film LPF, a third adhesive layer 30, and a fourth adhesive layer 40.

The anti-reflection member ARM may be referred to as the anti-reflection layer. The anti-reflection member ARM may decrease the reflectance of external light incident toward the display panel DP. In an embodiment, the anti-reflection member ARM may include a polarizer film. The polarizer film may include a phase retarder and/or a polarizer.

In an embodiment, the anti-reflection member ARM may include color filters having a predetermined arrangement. In an embodiment, for example, the color filters may be arranged to correspond to the colors of light emitted by the pixels included in the display panel DP. The color filters may decrease the reflectance of external light by filtering the external light into the colors of light emitted by the pixels. In addition, the anti-reflection member ARM may further include a black matrix adjacent to the color filters.

The third adhesive layer 30 may be disposed between the anti-reflection member ARM and the display panel DP and may couple the anti-reflection member ARM and the display panel DP. However, without being limited thereto, the third adhesive layer 30 may be omitted, and the anti-reflection member ARM may be directly disposed on the display panel DP.

The display panel DP may include a first non-folding region DP-NFA1 corresponding to the first non-folding region NFA1 of the display device DD, a second non-folding region DP-NFA2 corresponding to the second non-folding region NFA2 of the display device DD, and a folding region DP-FA corresponding to the folding region FA of the display device DD.

Referring to FIG. 7, the display panel DP may be a component that generates an image and senses an input applied from the outside. In an embodiment, for example, the display panel DP may include the display layer 110 and the sensor layer 120.

The display layer 110 may be a component that substantially generates an image. The display layer 110 may be an emissive display layer. In an embodiment, for example, the display layer 110 may be an organic light emitting display layer, a quantum-dot display layer, or a micro-LED display layer.

The display layer 110 may include a base layer 111, a circuit layer 112, a light emitting element layer 113, and an encapsulation layer 114.

The base layer 111 may include a synthetic resin film. The synthetic resin film may include a thermosetting resin. The base layer 111 may have a multi-layer structure. In an embodiment, for example, the base layer 111 may have a three-layer structure including a synthetic resin layer, an adhesive layer, and a synthetic resin layer. In particular, the synthetic resin layers may be polyimide resin layers, and the materials thereof are not particularly limited. The synthetic resin layers may include at least one of an acrylic resin, a methacrylic resin, a polyisoprene resin, a vinyl resin, an epoxy resin, a urethane-based resin, a cellulosic resin, a siloxane-based resin, a polyamide resin, and a perylene-based resin. In addition, the base layer 111 may include a glass substrate, an organic/inorganic composite substrate, or the like.

The circuit layer 112 may be disposed on the base layer 111. The circuit layer 112 may include an insulating layer, a semiconductor pattern, a conductive pattern, and a signal line. An insulating layer, a semiconductor layer, and a conductive layer may be disposed on the base layer 111 by a process such as coating or deposition and may be selectively subjected to patterning by performing a photolithography process a plurality of times. Thereafter, the semiconductor pattern, the conductive pattern, and the signal line, which are included in the circuit layer 112, may be formed.

The light emitting element layer 113 may be disposed on the circuit layer 112. The light emitting element layer 113 may include light emitting elements. In an embodiment, for example, the light emitting element layer 113 may include an organic light emitting material, a quantum dot, a quantum rod, or a micro-LED.

The encapsulation layer 114 may be disposed on the light emitting element layer 113. The encapsulation layer 114 may include an inorganic layer, an organic layer, and an inorganic layer sequentially stacked one above another. However, layers constituting the encapsulation layer 114 are not limited thereto.

The inorganic layers may protect the light emitting element layer 113 from moisture and oxygen, and the organic layer may protect the light emitting element layer 113 from foreign matter such as dust particles. The inorganic layers may include a silicon nitride layer, a silicon oxy nitride layer, a silicon oxide layer, a titanium oxide layer, or an aluminum oxide layer. The organic layer may include, but is not limited to, an acrylic organic layer.

The sensor layer 120 may be disposed on the display layer 110. The sensor layer 120 may sense an external input applied from the outside. The external input may be a user input. The user input may include various types of external inputs, such as a part of the user's body, light, heat, a pen, or pressure.

The sensor layer 120 may be disposed on the display layer 110 through a continuous process. In this case, the sensor layer 120 may be expressed as being directly disposed on the display layer 110. When the sensor layer 120 is directly disposed on the display layer 110, this may mean that a third component is not disposed between the sensor layer 120 and the display layer 110. That is, a separate adhesive member may not be disposed between the sensor layer 120 and the display layer 110.

Alternatively, the sensor layer 120 may be coupled with the display layer 110 through an adhesive member. The adhesive member may include a conventional adhesive or sticky substance.

Referring again to FIG. 6, the lower protective film LPF may be coupled to a rear surface of the display panel DP through the fourth adhesive layer 40. The lower protective film LPF may prevent a scratch on the rear surface of the display panel DP during a manufacturing process of the display panel DP. The lower protective film LPF may be a colored polyimide film. In an embodiment, for example, the lower protective film LPF may be an opaque yellow film, but is not limited thereto.

The lower module LM may be disposed under the display panel DP. The lower module LM may include a cushion member CSM, the support plate SPT, a cover layer CVL, a lower plate LPT, a sixth adhesive layer 60, and a seventh adhesive layer 70.

The cushion member CSM may be disposed under the lower protective film LPF. The fifth adhesive layer 50 may be disposed between the lower protective film LPF and the cushion member CSM and may couple the lower protective film LPF and the cushion member CSM.

The cushion member CSM may protect the display panel DP from an impact transmitted from below. The impact resistance characteristics of the display device DD may be improved by the cushion member CSM.

The cushion member CSM may include a barrier film BRF and a cushion layer CSL. Components included in the cushion member CSM are not limited to the aforementioned components. At least a part of the aforementioned components may be omitted, and other components may be added.

The barrier film BRF may improve impact resistance performance. The barrier film BRF may serve to prevent deformation of the display panel DP. The barrier film BRF may be a synthetic resin film, for example, a polyimide film, but is not limited thereto.

The cushion layer CSL may include, for example, expanded foam or a sponge. The expanded foam may include polyurethane foam or thermoplastic polyurethane foam. When the cushion layer CSL includes expanded foam, the cushion layer CSL may be formed using the barrier film BRF as a base layer. In an embodiment, for example, cushion layer CSL may be formed by causing a foaming agent to foam on the barrier film BRF.

At least one of the barrier film BRF and the cushion layer CSL may have a color that absorbs light. In an embodiment, for example, at least one of the barrier film BRF and the cushion layer CSL may be black in color. In this case, components disposed under the cushion member CSM may be prevented from being visible from the outside.

In this embodiment, support plates for supporting the display panel DP may be disposed under the display panel DP. The support plates may include the support plate SPT and the lower plate LPT.

The support plate SPT may be disposed under the cushion member CSM. The sixth adhesive layer 60 may be disposed between the cushion member CSM and the support plate SPT and may couple the cushion member CSM and the support plate SPT.

In this embodiment, the support plate SPT may include a first support part SA1 overlapping the first non-folding region DP-NFA1 of the display panel DP, a second support part SA2 overlapping the second non-folding region DP-NFA2 of the display panel DP, and a third support part SA3 overlapping the folding region DP-FA of the display panel DP. The third support part SA3 may be disposed between the first support part SA1 and the second support part SA2. That is, the first support part SA1 and the second support part SA2 may be spaced apart from each other in the second direction DR2 with the third support part SA3 therebetween. The third support part SA3, together with the folding region DP-FA of the display panel DP, may be foldable about a virtual folding axis extending in the first direction DR1.

In this embodiment, the third support part SA3 may have openings OP defined therein. That is, the openings OP may be defined in a region overlapping the folding region DP-FA of the display panel DP. The openings OP may be formed through the support plate SPT from a front surface F-SPT to a rear surface B-SPT of the support plate SPT. The front surface F-SPT of the support plate SPT may be adjacent to the display module DM, and the rear surface B-SPT of the support plate SPT may face away from the front surface F-SPT and may be adjacent to the lower plate LPT that will be described below. A portion of the support plate SPT may be more easily deformed by the openings OP.

Referring to FIGS. 8 and 9, the plurality of openings OP may be defined in a grid pattern in the third support part SA3. The openings OP may be arranged according to a predetermined rule. Because the openings OP are defined in the third support part SA3, the area of the third support part SA3 may be decreased, and thus the rigidity in the third support part SA3 may be lowered. When the openings OP are defined in the third support part SA3, the flexibility of the support plate SPT in the third support part SA3 may be improved, as compared with when the openings OP are not defined in the third support part SA3. Accordingly, the support plate SPT may be more easily bent.

The openings OP may be arranged in the first direction DR1 and the second direction DR2. The openings OP may extend longer in the first direction DR1 than in the second direction DR2. In an embodiment, for example, the openings OP arranged in the h-th column and the openings OP arranged in the (h+1)th column may be staggered with respect to each other. "h" may be a natural number, and the columns may correspond to the first direction DR1.

The support plate SPT may have a hole SPT-MH defined therein. The hole SPT-MH may be defined to penetrate the support plate SPT. The hole SPT-MH of the support plate SPT may form a portion of the module hole MH (refer to FIG. 4) of the lower module LM (refer to FIG. 4). At least a portion of the camera module CMM (refer to FIG. 4) may be disposed in the hole SPT-MH of the support plate SPT. According to this embodiment, the lower module LM includes the support plate SPT having high shear stress and improved impact resistance and elastic resilience. Accordingly, even though the support plate SPT has the hole SPT-MH defined therein and an external impact is applied to a portion adjacent to the sensor region ED-SA of the electronic device ED (refer to FIG. 1), damage to the support plate SPT may be reduced or prevented.

Referring again to FIG. 6, the cover layer CVL may be attached to the bottom of the support plate SPT. The cover layer CVL may be attached to the third support part SA3 of the support plate SPT. The cover layer CVL may cover the openings OP of the support plate SPT. Accordingly, the cover layer CVL may prevent infiltration of foreign matter into the openings OP.

The cover layer CVL may include a material having a lower elastic modulus than the support plate SPT. In an embodiment, for example, the cover layer CVL may include thermoplastic polyurethane, but is not limited thereto.

The lower plate LPT may be disposed under the support plate SPT. The lower plate LPT may include a plurality of lower plates. The lower plate LPT may include a first lower plate LPT1 and a second lower plate LPT2. The first lower plate LPT1 may be disposed to overlap the first non-folding region DP-NFA1 and one portion of the folding region DP-FA of the display panel DP, and the second lower plate LPT2 may be disposed to overlap the second non-folding region DP-NFA2 and another portion of the folding region DP-FA of the display panel DP.

The first lower plate LPT1 and the second lower plate LPT2 may be spaced apart from each other. However, the first and second lower plates LPT1 and LPT2 may be positioned as close as possible to each other and may support the region of the support plate SPT where the openings OP are formed. In an embodiment, for example, the first and second lower plates LPT1 and LPT2 may prevent the region of the support plate SPT having the openings OP defined therein from being deformed by pressure applied from above. Detailed description about the lower plate LPT will be given below.

The seventh adhesive layer 70 may be disposed between the support plate SPT and the lower plate LPT and may couple the support plate SPT and the lower plate LPT. The seventh adhesive layer 70 may include a first part 70-1 disposed between the support plate SPT and the first lower plate LPT1, and a second part 70-1 disposed between the support plate SPT and the second lower plate LPT2.

In an embodiment, functional layers may be additionally disposed under the lower plate LPT. The functional layers may include a heat radiating layer, an insulating layer, or the like.

Figure 10A:
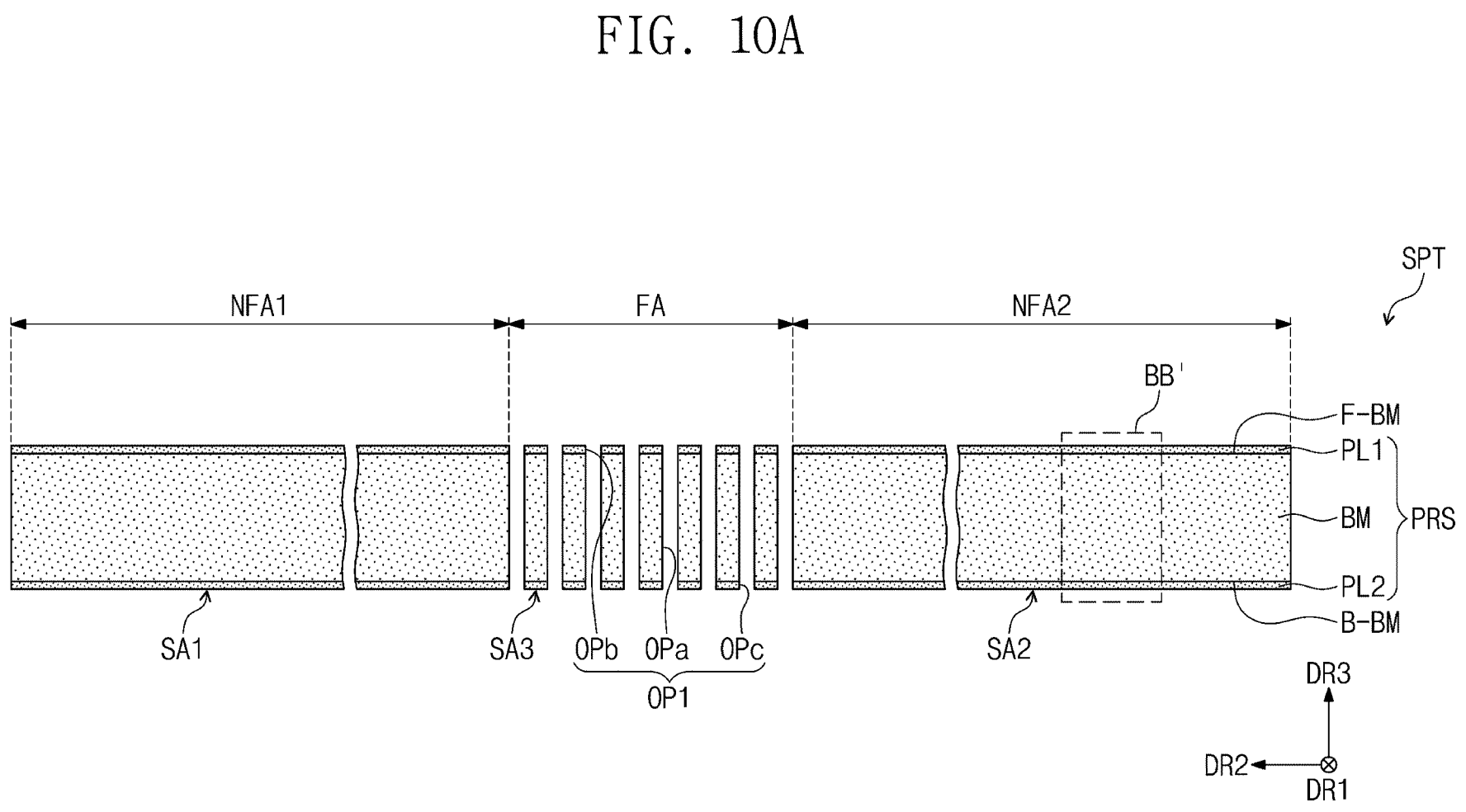
Figure 10B:
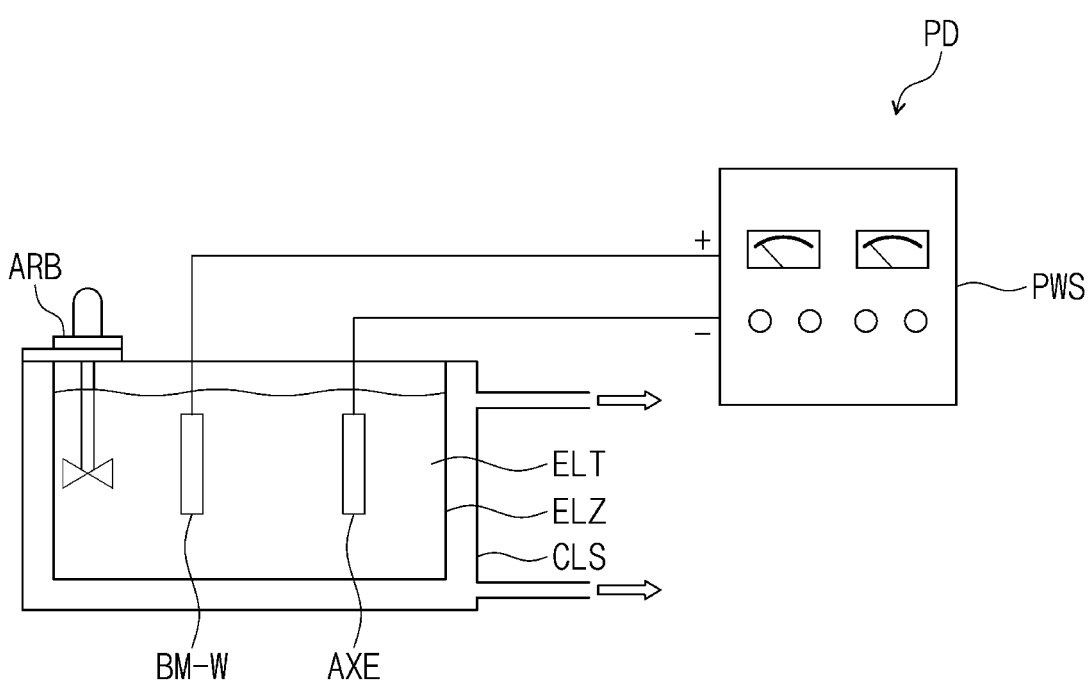
FIG. 10B is a sectional view illustrating part of a method of manufacturing the support plate according to an embodiment of the present disclosure.
Figure 11A:
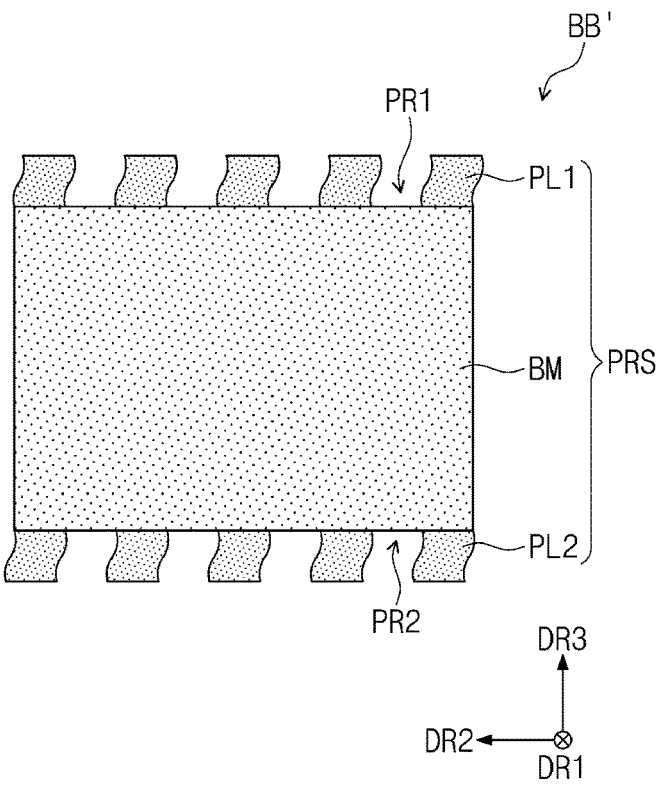
FIGS. 11A to 11C are enlarged sectional views of region BB' of FIG. 10A.
Figure 11B:
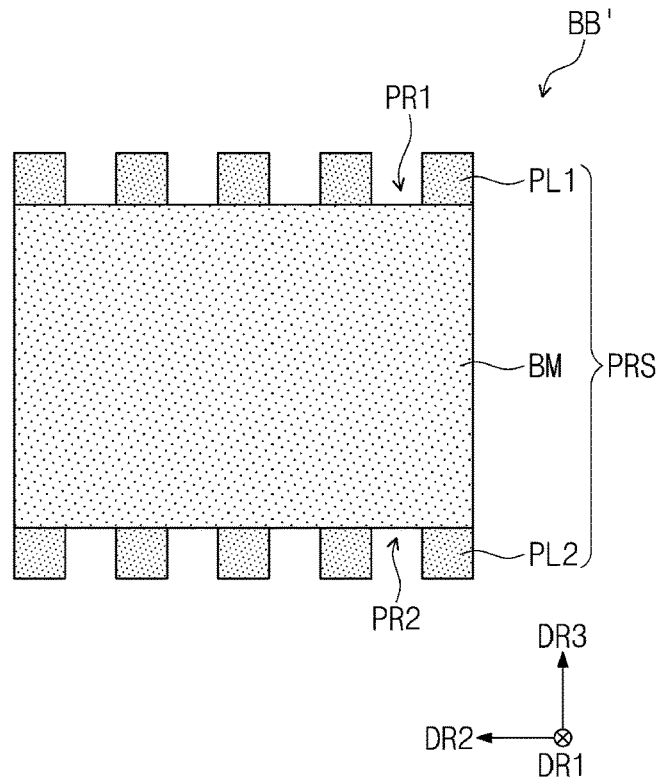
Figure 11C:
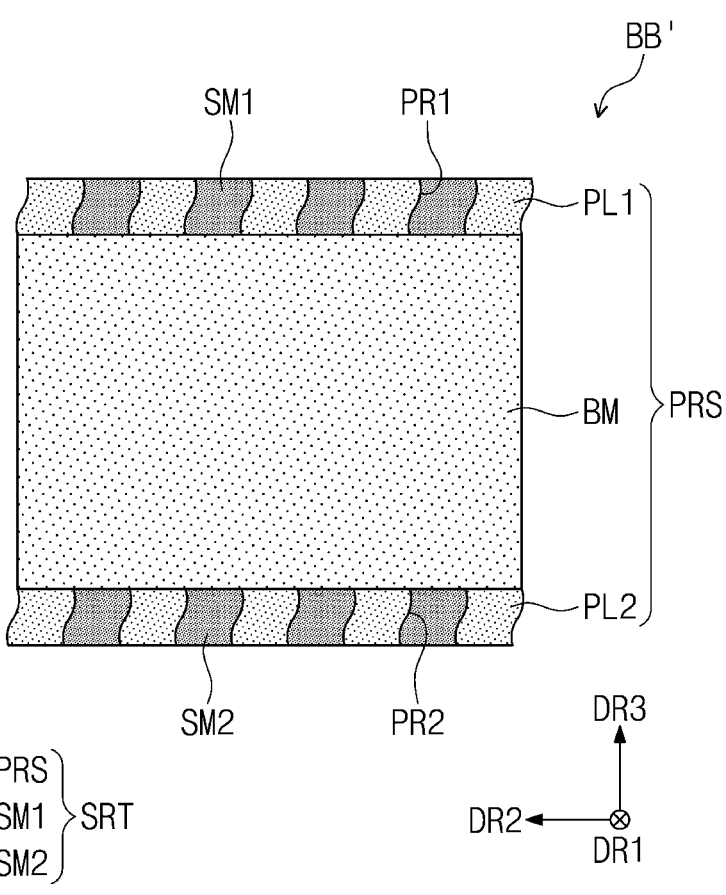

FIG. 10A is a sectional view of the support plate according to an embodiment of the present disclosure. FIG. 10B is a sectional view illustrating part of a method of manufacturing the support plate according to an embodiment of the present disclosure. FIGS. 11A to 11C are enlarged sectional views of region BB' of FIG. 10A.

Referring to FIG. 10A, in this embodiment, the support plate SPT may include a porous substrate PRS. The porous substrate PRS may include a base material BM, a first porous film PL1, and a second porous film PL2. The first porous film PL1 and the second porous film PL2 may be spaced apart from each other in the thickness direction (that is, the third direction DR3) with the base material BM therebetween.

The base material BM may include a metal. That is, the base material BM may be a metallic base material. In an embodiment, for example, the base material BM may include one of aluminum, magnesium, and titanium. However, without being limited thereto, the base material BM may include a material that can be subjected to anodic oxidation (or, anodizing) or plasma electrolytic oxidation ("PEO") that will be described below. In an embodiment, the base material BM may include a light metal.

The first porous film PL1 may be formed on a front surface F-BM of the base material BM. The first porous film PL1 may include metal oxide. The metal oxide included in the first porous film PL1 may be oxide of the metal included in the base material BM. The first porous film PL1 may be an oxide film formed on the front surface F-BM of the base material BM. The first porous film PL1 may be referred to as a "first oxide film". In an embodiment, for example, the first porous film PL1 may be an aluminum oxide film, a magnesium oxide film, or a titanium oxide film.

The second porous film PL2 may be formed on a rear surface B-BM of the base material BM. The second porous film PL2 may include metal oxide. The metal oxide included in the second porous film PL2 may be oxide of the metal included in the base material BM. The second porous film PL2 may be an oxide film formed on the rear surface B-BM of the base material BM. The second porous film PL2 may be referred to as a "second oxide film". In an embodiment, for example, the second porous film PL2 may be an aluminum oxide film, a magnesium oxide film, or a titanium oxide film.

In this embodiment, the first and second porous films PL1 and PL2 may be formed by anodizing the base material BM.

FIG. 10B is a schematic view illustrating a process of anodizing a working base material BM-W. An anodizing apparatus PD is briefly illustrated in FIG. 10B.

Referring to FIG. 10B, the working base material BM-W may be a metallic base material provided to form the porous films PL1 and PL2 (refer to FIG. 10A). The anodizing apparatus PD may include a power supply PWS for applying a voltage, an electrolyzer ELZ filled with an electrolyte ELT, a cooling device CLS for maintaining the temperature of the electrolyte ELT, and a bubble generator ARB for minimizing a concentration difference in the electrolyte ELT and supplementing oxygen ions consumed during electrolytic oxidation. During the anodizing process, the power supply PWS may apply a voltage of 15 V to 50 V.

The working base material BM-W may be connected to a positive electrode of the power supply PWS, and an auxiliary electrode AXE may be connected to a negative electrode of the power supply PWS. The working base material BM-W and the auxiliary electrode AXE may be immersed in the electrolyte ELT. When electrolysis is performed in this state, a surface of the working base material BM-W may be oxidized by oxygen ($O_2$) generated at the positive electrode, and an oxide film may be formed on the working base material BM-W. The oxide film formed on the working base material BM-W may correspond to the first porous film PL1 and the second porous film PL2 of FIG. 10A.

Referring again to FIG. 10A, in this embodiment, the openings OP (refer to FIG. 6) defined in the support plate SPT may correspond to openings OP1 defined in the porous substrate PRS. Each of the base material BM, the first porous film PL1, and the second porous film PL2 may have through-openings defined therein in the thickness direction of the display panel DP. Openings OPb of the first porous film PL1, openings OPa of the base material BM, and openings OPc of the second porous film PL2 may be aligned in the third direction DR3 to form the openings OP1 defined in the porous substrate PRS.

In an embodiment, the openings OP1 of the porous substrate PRS may be formed through a photolithography process. Photoresist or dry film resist ("DFR") may be used in the photolithography process for forming the openings OP1 of the porous substrate PRS.

Referring to FIGS. 10A to 11B, pores may be included in each of the first porous film PL1 and the second porous film PL2.

The pores defined in the first porous film PL1 (hereinafter, referred to as the first pores PR1) may be formed by removing portions of the first porous film PL1 in the thickness direction (that is, the third direction DR3). The first pores PR1 may be formed in a shape similar to a pillar shape.

The pores defined in the second porous film PL2 (hereinafter, referred to as the second pores PR2) may be formed by removing portions of the second porous film PL2 in the thickness direction (that is, the third direction DR3). The second pores PR2 may be formed in a shape similar to a pillar shape.

In an embodiment, as illustrated in FIG. 11A, the first pores PR1 and the second pores PR2 may extend in a wave shape in the thickness direction in a sectional view. However, the present disclosure is not limited thereto. As illustrated in FIG. 11B, in another embodiment of the present disclosure, the first pores PR1 and the second pores PR2 may extend in a straight line in the thickness direction in a sectional view.

According to this embodiment, when an external impact is applied toward the display device DD (refer to FIG. 4), empty spaces that can be pressed may be provided by the pores PR1 and PR2 in the porous films PL1 and PL2. Thus, the time during which the impact is applied may be increased, and the amount of impact applied to the display device DD (refer to FIG. 4) may be reduced. Accordingly, the impact resistance of the support plate SPT to the external impact may be improved, and damage to the display device DD (refer to FIG. 4) due to the external impact may be effectively reduced or prevented.

According to this embodiment, the porous films PL1 and PL2 may be disposed not only on the front surface F-BM but also on the rear surface B-BM of the base material BM, and thus the support plate SPT may easily return to its original state from a state in which the first and second porous films PL1 and PL2 are pressed by an external impact. That is, the elastic resilience of the support plate SPT may be improved, and deformation of the display device DD may be effectively reduced or prevented accordingly.

According to this embodiment, the porous substrate PRS may include the metallic base material BM and the porous films PL1 and PL2 formed on the front surface F-BM and the rear surface B-BM of the metallic base material BM, respectively. Accordingly, the support plate SPT may have high shear stress through the metallic base material BM and may have improved impact resistance through the porous films PL1 and PL2. When a metal plate is applied to a support plate, it is desirable to control shear stress and impact resistance by changing the basic physical properties, size, specific gravity, and/or thickness of a metallic material included in the metal plate. However, there is a trade-off between the shear stress and the impact resistance of the metallic material, and therefore it is difficult to improve both the shear stress and the impact resistance. In contrast, in this embodiment, the porous films PL1 and PL2 may be formed by anodizing the metallic base material BM. Accordingly, the support plate SPT may have high shear stress and improved impact resistance. Thus, the reliability of the support plate SPT may be effectively improved. In addition, according to this embodiment, the metallic base material BM may include a light metal. Accordingly, the support plate SPT may be made light in weight.

Referring to FIG. 11C, in this embodiment, the support plate SPT may include the porous substrate PRS, first sealing agents SM1, and second sealing agents SM2. That is, when compared to that in the embodiment described with reference to FIG. 11A, the support plate SPT may further include the first sealing agents SM1 and the second sealing agents SM2.

The first sealing agents SM1 may fill the first pores PR1 in the first porous film PL1. That is, the first sealing agents SM1 may be disposed in the first pores PR1. The second sealing agents SM2 may fill the second pores PR2 in the second porous film PL2. That is, the second sealing agents SM2 may be disposed in the second pores PR2.

In an embodiment, each of the first sealing agents SM1 and the second sealing agents SM2 may include a coloring agent. In an embodiment, for example, the coloring agent may include an organic pigment, an inorganic pigment, or an organic dye. Each of the first sealing agents SM1 and the second sealing agents SM2 may have a color. In an embodiment, for example, the first sealing agents SM1 and the second sealing agents SM2 may be black in color. Accordingly, light incident from outside the electronic device ED (refer to FIG. 4) may be prevented from being reflected, and thus the support plate SPT and components disposed under the support plate SPT may not be visible to the user when the electronic device ED (refer to FIG. 4) is viewed from above the window module WM (refer to FIG. 4).

In an embodiment, each of the first sealing agents SM1 and the second sealing agents SM2 may include an elastic material. In an embodiment, for example, each of the first sealing agents SM1 and the second sealing agents SM2 may include a silicone-based elastic material. Alternatively, each of the first sealing agents SM1 and the second sealing agents SM2 may include thermoplastic polyurethane (TPU). Each of the first sealing agents SM1 and the second sealing agents SM2 may include a gel-type material. By filling the elastic materials in the pores PR1 and PR2, the impact resistance and elastic resilience of the support plate SPT may be further improved.

Figure 12A:
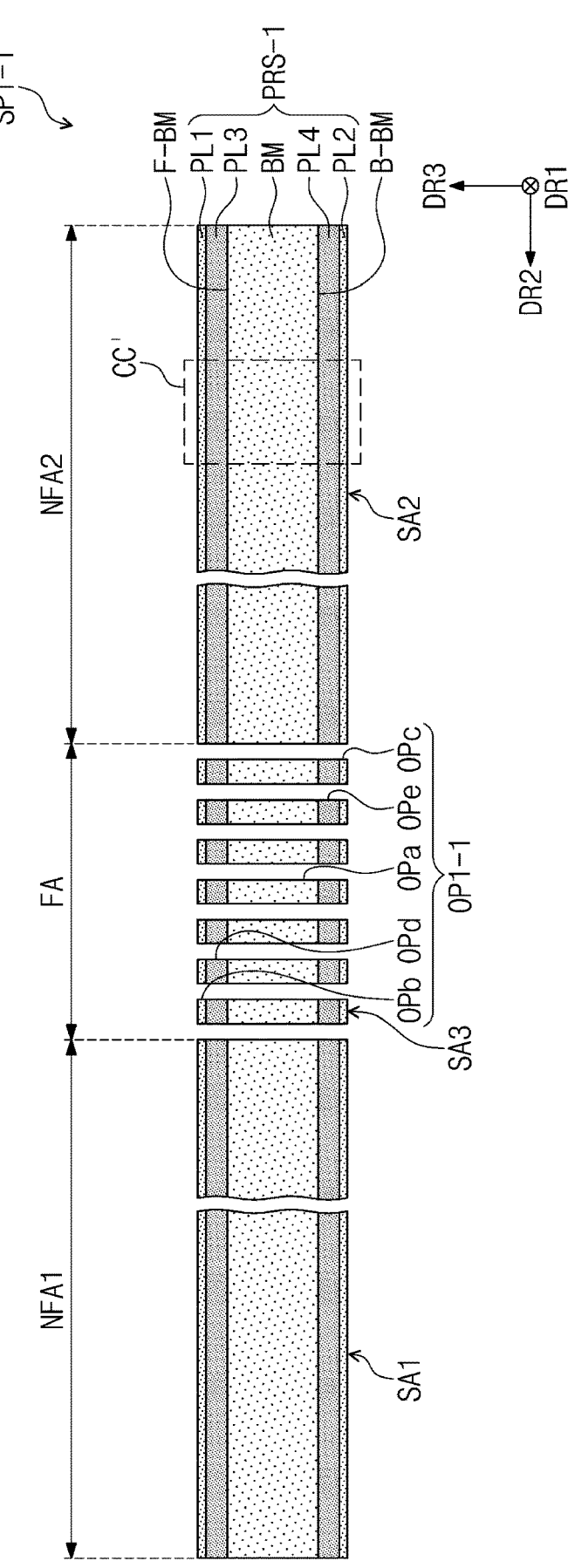
FIG. 12A is a sectional view of a support plate according to another embodiment of the present disclosure.
Figure 12B:
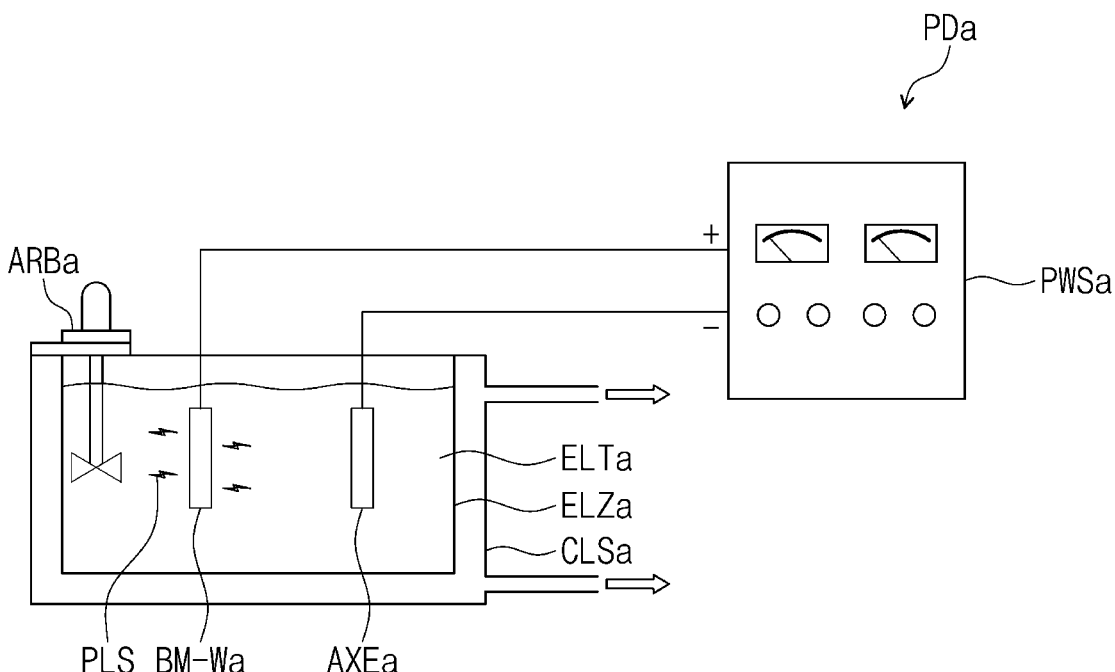
FIG. 12B is a sectional view illustrating part of a method of manufacturing the support plate of FIG. 12A according to an embodiment of the present disclosure.
Figure 13A:
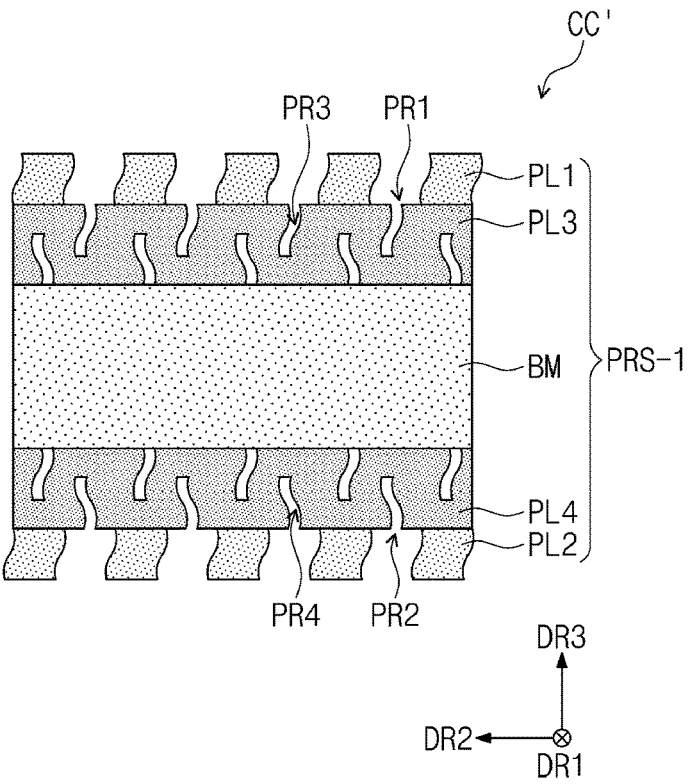
FIGS. 13A to 13C are enlarged sectional views of region CC' of FIG. 12A.
Figure 13B:
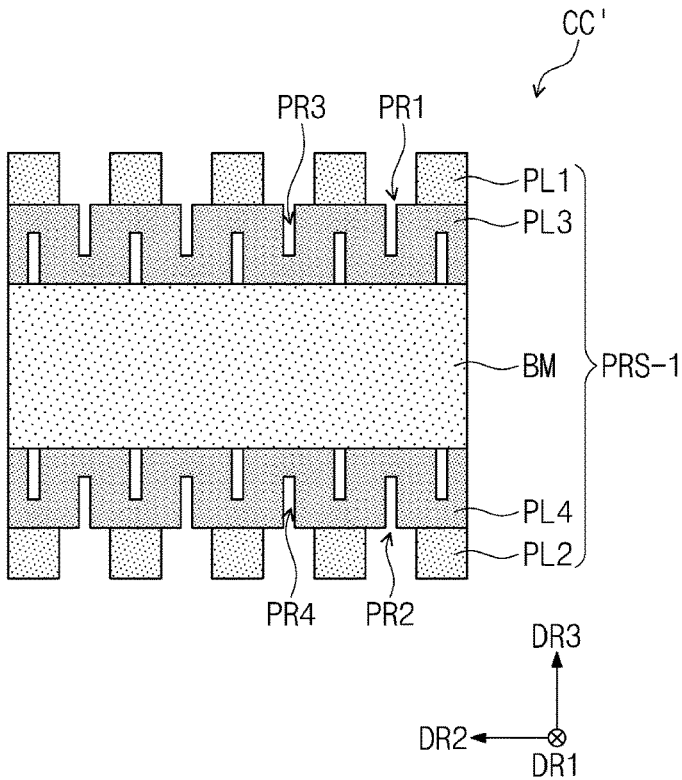
Figure 13C:
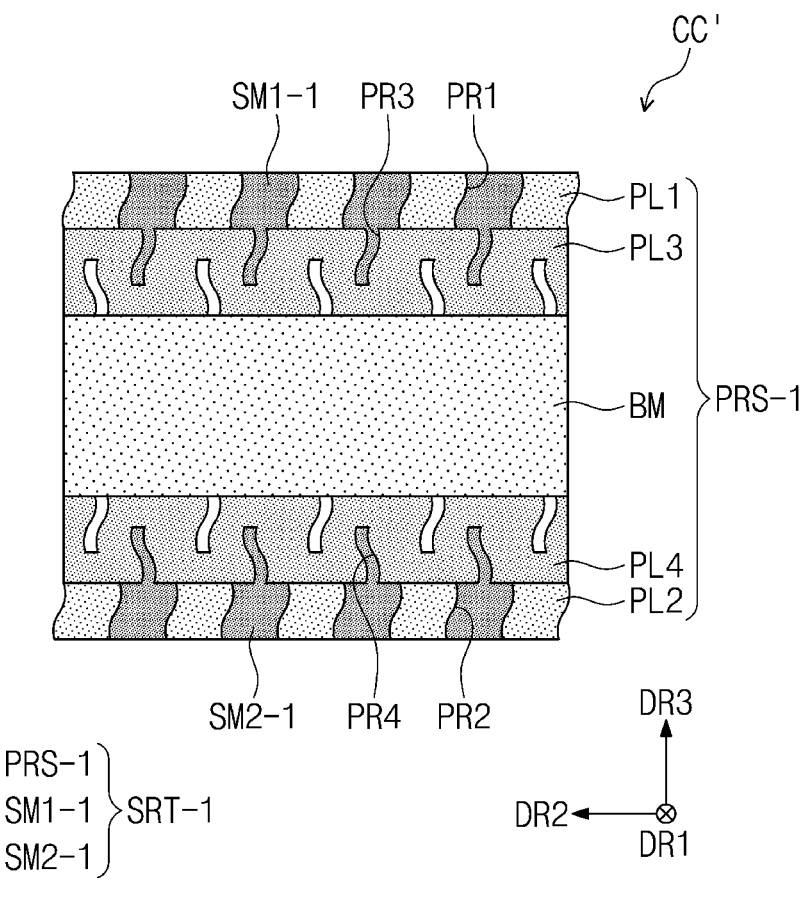

FIG. 12A is a sectional view of a support plate according to another embodiment of the present disclosure. FIG. 12B is a sectional view illustrating part of a method of manufacturing the support plate of FIG. 12A according to an embodiment of the present disclosure. FIGS. 13A to 13C are enlarged sectional views of region CC' of FIG. 12A.

Referring to FIG. 12A, in this embodiment, the support plate SPT-1 may include a porous substrate PRS-1. The porous substrate PRS-1 according to this embodiment may include a base material BM, a first porous film PL1, a second porous film PL2, a third porous film PL3, and a fourth porous film PL4.

The first porous film PL1 and the third porous film PL3 may be disposed on the base material BM, and the second porous film PL2 and the fourth porous film PLA may be disposed under the base material BM. The third porous film PL3 may be disposed between the base material BM and the first porous film PL1, and the fourth porous film PL4 may be disposed between the base material BM and the second porous film PL2.

After the first porous film PL1 and the second porous film PL2 are formed on a front surface F-BM and a rear surface B-BM of the base material BM, respectively, the third porous film PL3 may be formed at the interface between the base material BM and the first porous film PL1, and the fourth porous film PL4 may be formed at the interface between the base material BM and the second porous film PL2. Accordingly, the porous substrate PRS-1 including the base material BM and the first to fourth porous films PL1 to PL4 may be formed.

The third porous film PL3 may include metal oxide. The metal oxide included in the third porous film PL3 may be oxide of a metal included in the base material BM. The third porous film PL3 may be an oxide film formed at the interface between the base material BM and the first porous film PL1. The third porous film PL3 may be referred to as a "third oxide film".

The fourth porous film PL4 may include metal oxide. The metal oxide included in the fourth porous film PLA may be oxide of the metal included in the base material BM. The fourth porous film PLA may be an oxide film formed at the interface between the base material BM and the second porous film PL2. The fourth porous film PLA may be referred to as a "fourth oxide film".

In this embodiment, the first to fourth porous films PL1 to PL4 may be formed by performing a plasma electrolytic oxidation (PEO) process on the base material BM.

FIG. 12B is a schematic view illustrating a process of making a working base material BM-Wa subject to plasma electrolytic oxidation. A plasma electrolytic oxidation apparatus PDa is briefly illustrated in FIG. 12B.

Referring to FIG. 12B, the working base material BM-Wa may be a metallic base material provided to form the porous films PL1 to PL4 (refer to FIG. 12A). The plasma electrolytic oxidation apparatus PDa may include a power supply PWSa for applying a voltage, an electrolyzer ELZa filled with an electrolyte ELTa, a cooling device CLSa for maintaining the temperature of the electrolyte ELTa, and a bubble generator ARBa for minimizing a concentration difference in the electrolyte ELTa and supplementing oxygen ions consumed during electrolytic oxidation. During the plasma electrolytic oxidation process, the power supply PWSa may apply a voltage of 350 V to 550 V. When the plasma electrolytic oxidation process is performed, a higher voltage may be provided than when the anodizing process is performed.

The working base material BM-Wa may be connected to a positive electrode of the power supply PWSa, and an auxiliary electrode AXEa may be connected to a negative electrode of the power supply PWSa. The working base material BM-Wa and the auxiliary electrode AXEa may be immersed in the electrolyte ELTa. When electrolysis is performed in this state, a surface of the working base material BM-Wa may be oxidized by oxygen ($O_2$) generated at the positive electrode, and an oxide film may be formed on the working base material BM-Wa. At this time, a strong current field that is locally formed may generate plasma (or, arc or spark) from an oxygen ($O_2$) gas that reacts inside the formed oxide film, and instantaneously formed oxide may be fused accordingly. An oxide film formed by the fusion of the instantaneously formed oxide may have high-density characteristics when compared to the previously formed oxide film. The previously formed oxide film may correspond to the first and second porous films PL1 and PL2 (refer to FIG. 12A), and the oxide film formed by the fusion of the instantaneously formed oxide may correspond to the third and fourth porous films PL3 and PLA (refer to FIG. 12A).

Referring again to FIG. 12A, in this embodiment, openings OP (refer to FIG. 6) defined in the support plate SPT-1 may correspond to openings OP1-1 defined in the porous substrate PRS-1. Each of the base material BM and the first to fourth porous films PL1 to PLA may have through-openings defined therein in the thickness direction. Openings OPb of the first porous film PL1, openings OPd of the third porous film PL3, openings OPa of the base material BM, openings OPe of the fourth porous film PL4, and openings OPc of the second porous film PL2 may be aligned in the third direction DR3 to form the openings OP1-1 defined in the porous substrate PRS-1.

In an embodiment, the openings OP1-1 of the porous substrate PRS-1 may be formed through a photolithography process. Photoresist or dry film resist (DFR) may be used in the photolithography process for forming the openings OP1-1 of the porous substrate PRS-1.

Referring to FIGS. 12A to 13B, pores may be included in each of the first to fourth porous films PL1 to PLA. The description given above with reference to FIG. 11A may be similarly applied to pores formed in the first porous film PL1 (that is, first pores PR1) and pores formed in the second porous film PL2 (that is, second pores PR2).

Pores defined in the third porous film PL3 (hereinafter, referred to as the third pores PR3) may be formed by removing portions of the third porous film PL3 in the thickness direction (that is, the third direction DR3). The third pores PR3 may be formed in a shape similar to a pillar shape.

Pores defined in the fourth porous film PL4 (hereinafter, referred to as the fourth pores PR4) may be formed by removing portions of the fourth porous film PLA in the thickness direction (that is, the third direction DR3). The fourth pores PR4 may be formed in a shape similar to a pillar shape.

The third pores PR3 in the third porous film PL3 may be smaller than the first pores PR1 in the first porous film PL1. In an embodiment, for example, in a sectional view, the widths of the third pores PR3 in the second direction DR2 may be less than the widths of the first pores PR1 in the second direction DR2. The third pores PR3 may have smaller volumes than the first pores PR1. The porosity of the third porous film PL3 may be lower than the porosity of the first porous film PL1. The density of the third porous film PL3 may be higher than the density of the first porous film PL1. The first porous film PL1 may be referred to as the first low-density film, and the third porous film PL3 may be referred to as the first high-density film. The hardness of the third porous film PL3 may be higher than the hardness of the first porous film PL1.

The fourth pores PR4 in the fourth porous film PL4 may be smaller than the second pores PR2 in the second porous film PL2. In an embodiment, for example, in a sectional view, the widths of the fourth pores PR4 in the second direction DR2 may be less than the widths of the second pores PR2 in the second direction DR2. The fourth pores PR4 may have smaller volumes than the second pores PR2. The porosity of the fourth porous film PL4 may be lower than the porosity of the second porous film PL2. The density of the fourth porous film PL4 may be higher than the density of the second porous film PL2. The second porous film PL2 may be referred to as the second low-density film, and the fourth porous film PL4 may be referred to as the second high-density film. The hardness of the fourth porous film PLA may be higher than the hardness of the second porous film PL2.

In an embodiment, as illustrated in FIG. 13A, the first to fourth pores PR1 to PR4 may extend in a wave shape in the thickness direction in a sectional view. However, embodiments of the present disclosure are not limited thereto. As illustrated in FIG. 13B, in another embodiment of the present disclosure, the first to fourth pores PR1 to PR4 may extend in a straight line in the thickness direction in a sectional view.

According to this embodiment, the porous substrate PRS-1 including the high-density films PL3 and PLA between the base material BM and the low-density films PL1 and PL2 may be provided through plasma electrolytic oxidation. The high-density films PL3 and PL4 may improve an adhesion force between the base material BM and the low-density films PL1 and PL2. The high-density films PL3 and PL4 may provide films having relatively high hardness between the base material BM and the low-density films PL1 and PL2 while providing spaces for impact dispersion between the base material BM and the low-density films PL1 and PL2, thereby reducing or preventing damage to the porous films PL1 to PL4 due to an external impact.

Referring to FIG. 13C, in this embodiment, the support plate SPT-1 may include the porous substrate PRS-1, first sealing agents SM1-1, and second sealing agents SM2-1. That is, when compared to that in the embodiment described with reference to FIG. 13A, the support plate SPT-1 may further include the first sealing agents SM1-1 and the second sealing agents SM2-1. The description given above with reference to FIG. 11C may be similarly applied to the first sealing agents SM1-1 and the second sealing agents SM2-1, and the following description will be focused on the difference.

The first sealing agents SM1-1 may fill the first pores PR1 in the first porous film PL1. That is, the first sealing agents SM1-1 may be disposed in the first pores PR1. In an embodiment, some of the third pores PR3 may be connected with the first pores PR1 adjacent thereto, and some of the first sealing agents SM1-1 may fill the third pores PR3 connected with the first pores PR1. In this specification, the first pores PR1 and the third pores PR3 connected with each other may refer to pores provided as integrated spaces.

The second sealing agents SM2-1 may fill the second pores PR2 in the second porous film PL2. That is, the second sealing agents SM2-1 may be disposed in the second pores PR2. In an embodiment, some of the fourth pores PR4 may be connected with the second pores PR2 adjacent thereto, and some of the second sealing agents SM2-1 may fill the fourth pores PR4 connected with the second pores PR2. In this specification, the second pores PR2 and the fourth pores PR4 connected with each other may refer to pores provided as integrated spaces.

Figure 14:
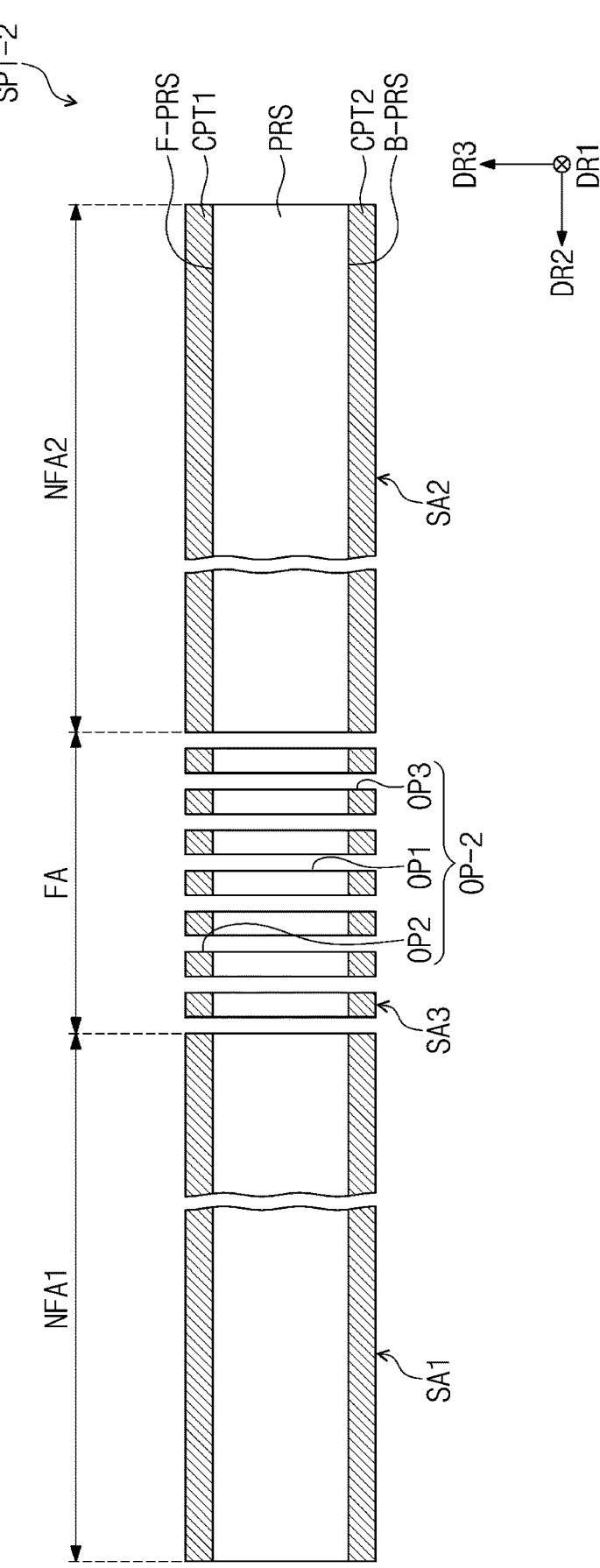
FIG. 14 is a sectional view of a support plate according to still another embodiment of the present disclosure.

FIG. 14 is a sectional view of a support plate according to still another embodiment of the present disclosure. Components identical or similar to the components described with reference to FIGS. 1 to 13C will be assigned with identical or similar reference numerals, and repetitive descriptions will be omitted.

Referring to FIG. 14, in this embodiment, the support plate SPT-2 may include a porous substrate PRS, a first cover substrate CPT1, and a second cover substrate CPT2. When compared to those in the embodiments described with reference to FIGS. 10A and 12A, the support plate SPT-2 may further include the first cover substrate CPT1 and the second cover substrate CPT2. The first cover substrate CPT1 and the second cover substrate CPT2 may be spaced apart from each other in the thickness direction (that is, the third direction DR3) with the porous substrate PRS therebetween.

In FIG. 14, the porous substrate PRS is briefly illustrated. The description given above with reference to FIGS. 10A to 11B may be applied to the porous substrate PRS. The porous substrate PRS may include the base material BM and the first and second porous films PL1 and PL2. Alternatively, the description given above with reference to FIGS. 12A to 13B may be applied to the porous substrate PRS. The porous substrate PRS may include the base material BM and the first to fourth porous films PL1 to PLA.

The first cover substrate CPT1 may be disposed on the porous substrate PRS. The first cover substrate CPT1 may be directly disposed on a front surface F-PRS of the porous substrate PRS. The second cover substrate CPT2 may be disposed under the porous substrate PRS. The second cover substrate CPT2 may be directly disposed on a rear surface B-PRS of the porous substrate PRS. In an embodiment, the first cover substrate CPT1 and the second cover substrate CPT2 may be directly disposed on the porous substrate PRS through a cladding process.

Each of the first cover substrate CPT1 and the second cover substrate CPT2 may include a first support part SA1, a second support part SA2, and a third support part SA3. The first to third support parts SA1, SA2, and SA3 of each of the first and second cover substrates CPT1 and CPT2 may correspond to first to third support parts SA1, SA2, and SA3 of the support plate SPT-2.

The first cover substrate CPT1 may define openings OP2 in the third support part SA3. The openings OP2 of the first cover substrate CPT1 may be defined to penetrate the first cover substrate CPT1 in the thickness direction (that is, the third direction DR3). The second cover substrate CPT2 may openings OP3 in the third support part SA3. The openings OP3 of the second cover substrate CPT2 may be defined to penetrate the second cover substrate CPT2 in the thickness direction (that is, the third direction DR3). The openings OP2 of the first cover substrate CPT1, openings OP1 of the porous substrate PRS, and the openings OP3 of the second cover substrate CPT2 may be aligned in the third direction DR3 to form openings OP-2 defined in the support plate SPT-2.

Each of the first cover substrate CPT1 and the second cover substrate CPT2 may include a metal. Each of the first cover substrate CPT1 and the second cover substrate CPT2 may be a metal substrate. In an embodiment, the metal included in each of the first cover substrate CPT1 and the second cover substrate CPT2 may include stainless steel (SUS). The cover substrates CPT1 and CPT2 may be disposed on the porous films defining pores formed therein, and thus damage to the porous films may be reduced or prevented. Accordingly, the reliability of the support plate SPT-2 may be effectively improved.

Figure 15:
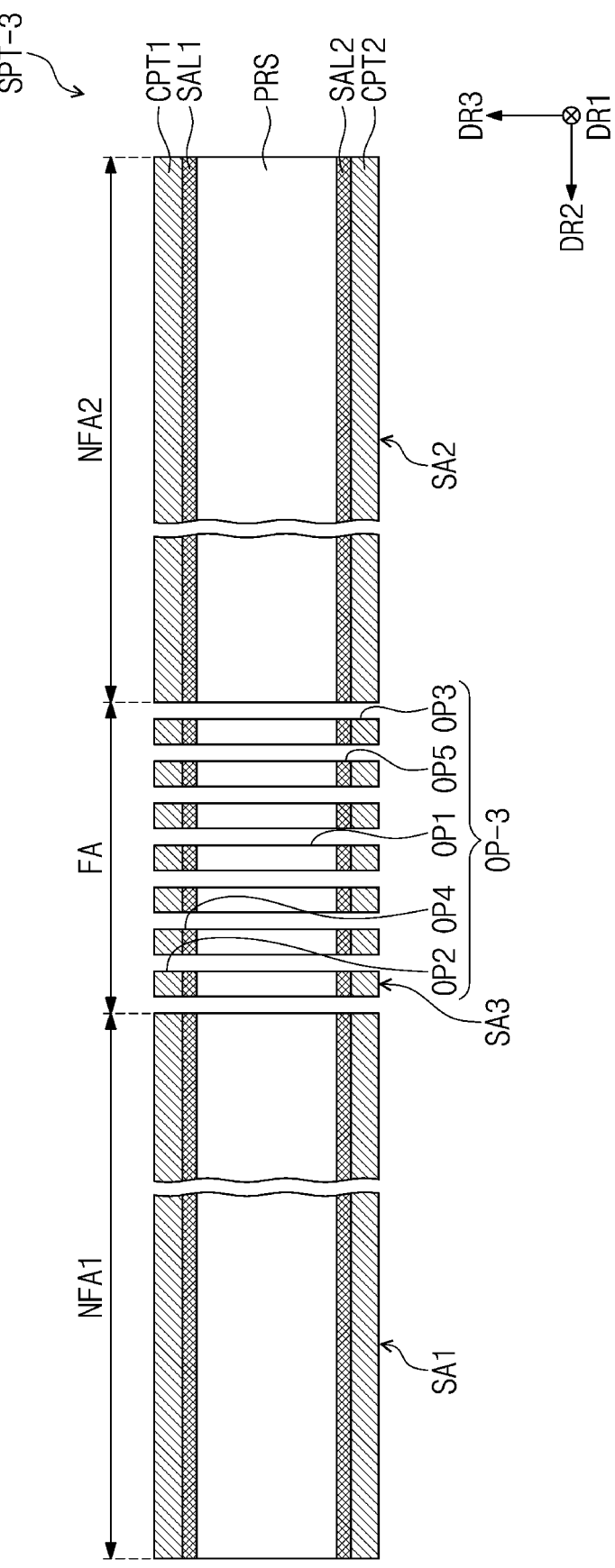
FIG. 15 is a sectional view of a support plate according to yet another embodiment of the present disclosure.

FIG. 15 is a sectional view of a support plate according to yet another embodiment of the present disclosure. Components identical or similar to the components described with reference to FIGS. 1 to 14 will be assigned with identical or similar reference numerals, and repetitive descriptions will be omitted.

Referring to FIG. 15, in this embodiment, the support plate SPT-3 may include a porous substrate PRS, a first cover substrate CPT1, a second cover substrate CPT2, a first adhesive support layer SAL1, and a second adhesive support layer SAL2. That is, when compared to that in the embodiment described with reference to FIG. 14, the support plate SPT-3 may further include the first adhesive support layer SAL1 and the second adhesive support layer SAL2.

The first adhesive support layer SAL1 may be disposed between the porous substrate PRS and the first cover substrate CPT1. The first adhesive support layer SAL1 may couple the porous substrate PRS and the first cover substrate CPT1. The second adhesive support layer SAL2 may be disposed between the porous substrate PRS and the second cover substrate CPT2. The second adhesive support layer SAL2 may couple the porous substrate PRS and the second cover substrate CPT2.

Each of the first adhesive support layer SAL1 and the second adhesive support layer SAL2 may include a transparent adhesive such as a pressure sensitive adhesive (PSA) or an optically clear adhesive (OCA), but is not limited thereto. For another example, each of the first adhesive support layer SAL1 and the second adhesive support layer SAL2 may include thermoplastic polyurethane (TPU).

Openings OP2 of the first cover substrate CPT1, openings OP4 of the first adhesive support layer SAL1, openings OP1 of the porous substrate PRS, openings OP5 of the second adhesive support layer SAL2, and openings OP3 of the second cover substrate CPT2 may be aligned in the third direction DR3 to form openings OP-3 defined in the support plate SPT-3.

According to this embodiment, the porous substrate PRS and the cover substrates CPT1 and CPT2 may be attached through the adhesive support layers SAL1 and SAL2, and a coupling force between the porous substrate PRS and the cover substrates CPT1 and CPT2 may be improved. Thus, even though folding and unfolding operations of the electronic device ED (refer to FIG. 1) are repeated, the coupled state of the porous substrate PRS and the cover substrates CPT1 and CPT2 may be stably maintained, and damage or deformation of the support plate SPT-3 may be reduced or prevented. Accordingly, the reliability of the support plate SPT-3 may be effectively improved.

Figure 16:
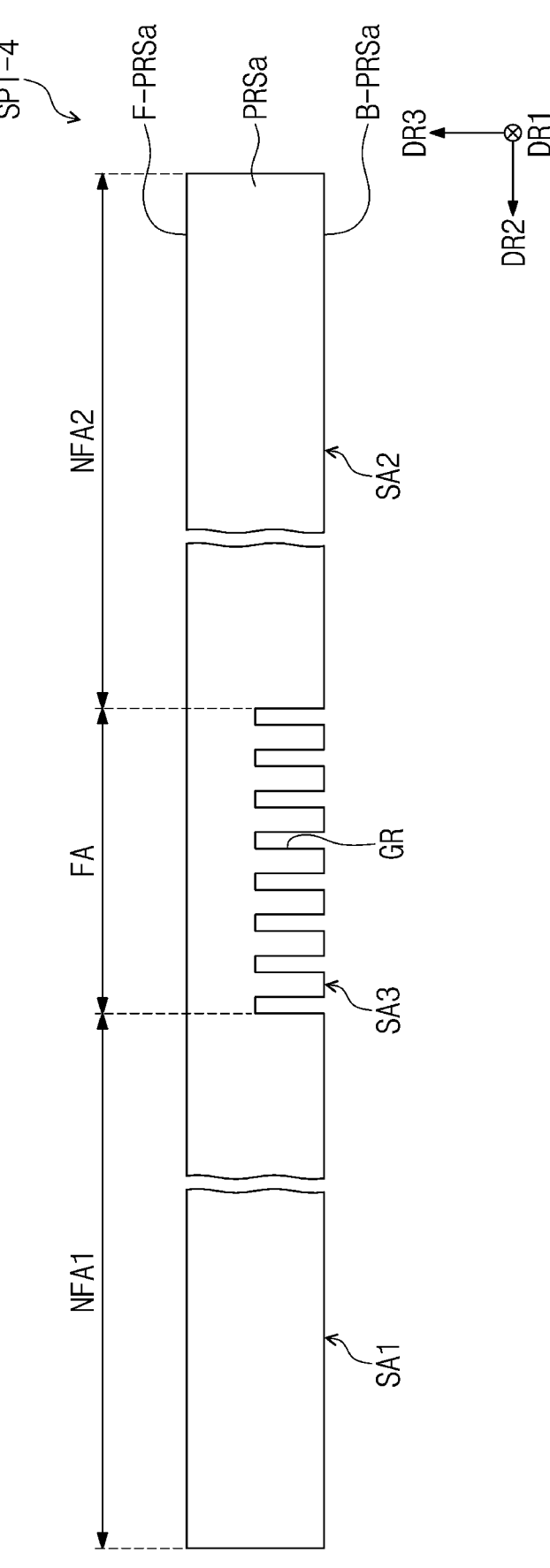
FIG. 16 is a sectional view of a support plate according to another embodiment of the present disclosure.

FIG. 16 is a sectional view of a support plate according to another embodiment of the present disclosure. Components identical or similar to the components described with reference to FIGS. 1 to 15 will be assigned with identical or similar reference numerals, and repetitive descriptions will be omitted.

Referring to FIG. 16, in this embodiment, the support plate SPT-4 may include a porous substrate PRSa. The description given above with reference to FIGS. 10A to 11C may be applied to the porous substrate PRSa, and the porous substrate PRSa may include the base material BM (refer to FIGS. 10A to 11C) and the first and second porous films PL1 and PL2 (refer to FIGS. 10A to 11C). Alternatively, the description given above with reference to FIGS. 12A to 13C may be applied to the porous substrate PRSa, and the porous substrate PRSa may include the base material BM (refer to FIGS. 12A to 13C) and the first to fourth porous films PL1 to PL4 (refer to FIGS. 12A to 13C).

A third support part SA3 of the porous substrate PRSa may define grooves GR therein. In the third support part SA3, the grooves GR may be defined on a rear surface B-PRSa of the porous substrate PRSa. In the third support part SA3, the grooves GR may be defined by removing portions of the porous substrate PRSa in the thickness direction from the rear surface B-PRSa of the porous substrate PRSa. In an embodiment, for example, the grooves GR may be defined by removing portions of the porous substrate PRSa from the rear surface B-PRSa of the porous substrate PRSa to midpoints between a front surface F-PRSa and the rear surface B-PRSa.

In an embodiment, when the porous substrate PRSa includes the base material BM and the first and second porous films PL1 and PL2 as described above with reference to FIG. 10A, the grooves GR may penetrate the second porous film PL2 and may be formed by removing portions of the base material BM. Alternatively, in an embodiment, when the porous substrate PRSa includes the base material BM and the first to fourth porous films PL1 to PL4 as described above with reference to FIG. 12A, the grooves GR may penetrate the second porous film PL2 and the fourth porous film PLA and may be formed by removing portions of the base material BM.

The grooves GR may be arranged in a grid form in a plan view. The arrangement of the grooves GR in a plan view may be similar to the arrangement (i.e., grid form) of the openings OP of FIG. 9 in a plan view.

When the electronic device ED (refer to FIG. 1) is folded in an in-folding manner, compressive stress may be dominant in a portion of the porous substrate PRSa adjacent to the front surface F-PRSa, and tensile stress may be dominant in a portion of the porous substrate PRSa adjacent to the rear surface B-PRSa. According to this embodiment, the grooves GR are not disposed in the region where the compressive stress is dominant, and thus cracks in the porous substrate PRSa due to the compressive stress may be minimized in a process in which the porous substrate PRSa is folded. Accordingly, the reliability of the support plate SPT-4 may be effectively improved.

FIG. 17 is a sectional view of a support plate according to still another embodiment of the present disclosure. Components identical or similar to the components described with reference to FIGS. 1 to 15 will be assigned with identical or similar reference numerals, and repetitive descriptions will be omitted.

In FIG. 17, for convenience of description, regions that correspond to the first non-folding region NFA1, the second non-folding region NFA2, and the folding region FA of the display module DM (refer to FIG. 6) are illustrated over the support plate SPT-5.

Referring to FIG. 17, in this embodiment, the support plate SPT-5 may include a porous substrate PRSb and a filling member FM.

The porous substrate PRSb may include a plurality of porous substrates. The plurality of porous substrates PRSb may include a first plate PT1 overlapping the first non-folding region NFA1 and a second plate PT2 overlapping the second non-folding region NFA2. The first plate PT1 and the second plate PT2 may be spaced apart from each other. That is, in this embodiment, the porous substrate PRSb may not be disposed in a region overlapping the folding region FA of the display module DM (refer to FIG. 6).

The filling member FM may be disposed between the first plate PT1 and the second plate PT2. The filling member FM may overlap the folding region FA.

In this embodiment, a first support part SA1 (refer to FIG. 6) of the support plate SPT-5 may correspond to a portion where the first plate PT1 is disposed, a second support part SA2 (refer to FIG. 6) of the support plate SPT-5 may correspond to a portion where the second plate PT2 is disposed, and a third support part SA3 (refer to FIG. 6) of the support plate SPT-5 may correspond to a portion where the filling member FM is disposed.

In this embodiment, the filling member FM may include an elastic material. In an embodiment, for example, the filling member FM may include a silicone-based elastic material. Alternatively, the filling member FM may include thermoplastic polyurethane (TPU). The filling member FM may include a gel-type material.

According to this embodiment, the filling member FM may be disposed in the portion overlapping the folding region FA, and thus the porous substrate PRSb may not include openings or grooves. Accordingly, a process of forming openings or grooves in the support plate SPT-5 may be omitted. Thus, a manufacturing process may be simplified, and manufacturing costs may be reduced. In addition, when the material of the support plate SPT-5 is selected, whether openings or grooves are able to be formed (e.g., whether patterning is able to be performed through a photolithography process) may not be considered, and thus the degree of freedom in the selection of the material may be improved.

Because the support plate SPT-5 according to this embodiment does not define openings therein, the cover layer CVL (refer to FIG. 6) attached to the support plate SPT-5 to prevent infiltration of foreign matter may be omitted.

Although FIG. 17 illustrates an example that the support plate SPT-5 includes only the porous substrate PRSb and the filling member FM, the present disclosure is not limited thereto. The first and second cover substrates CPT1 and CPT2 described above with reference to FIG. 14 may be additionally attached to the first and second plates PT1 and PT2 of the support plate SPT-5 in another embodiment. Alternatively, the first and second cover substrates CPT1 and CPT2 may be coupled to the first and second plates PT1 and PT2 through the first and second adhesive support layers SAL1 and SAL2 described above with reference to FIG. 15.

Figure 18A:
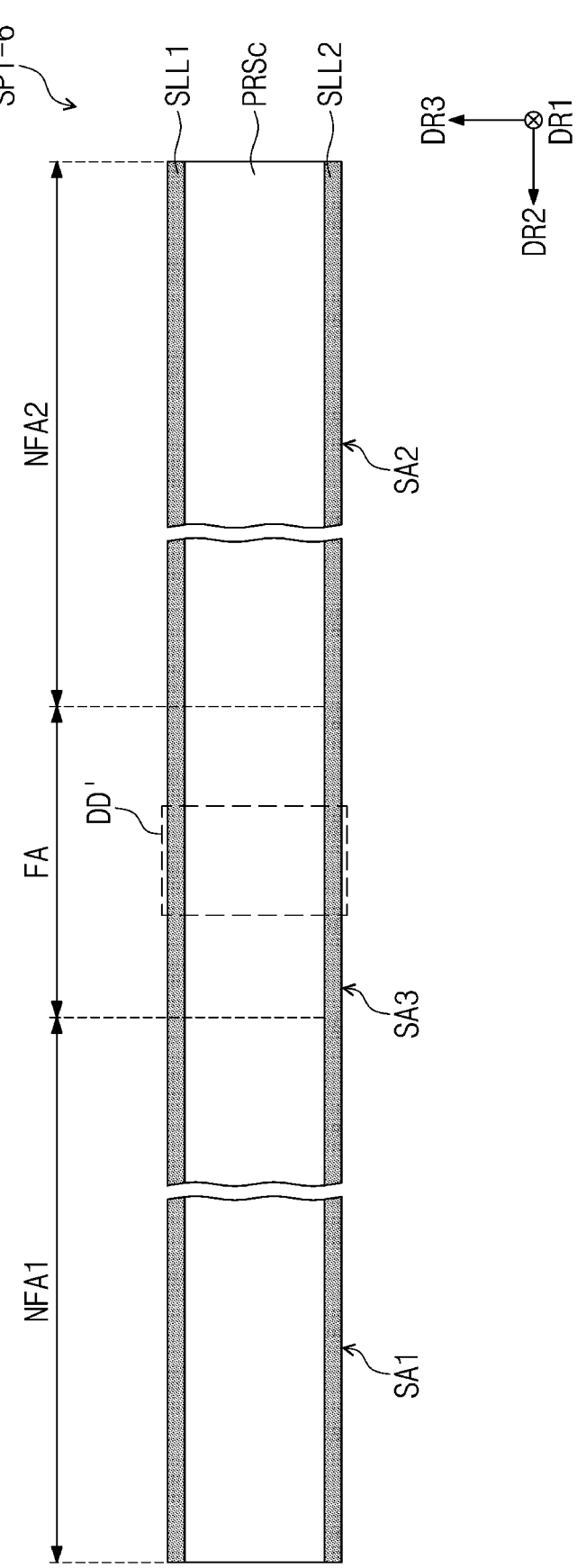
FIG. 18A is a sectional view of a support plate according to yet another embodiment of the present disclosure.
Figure 18B:
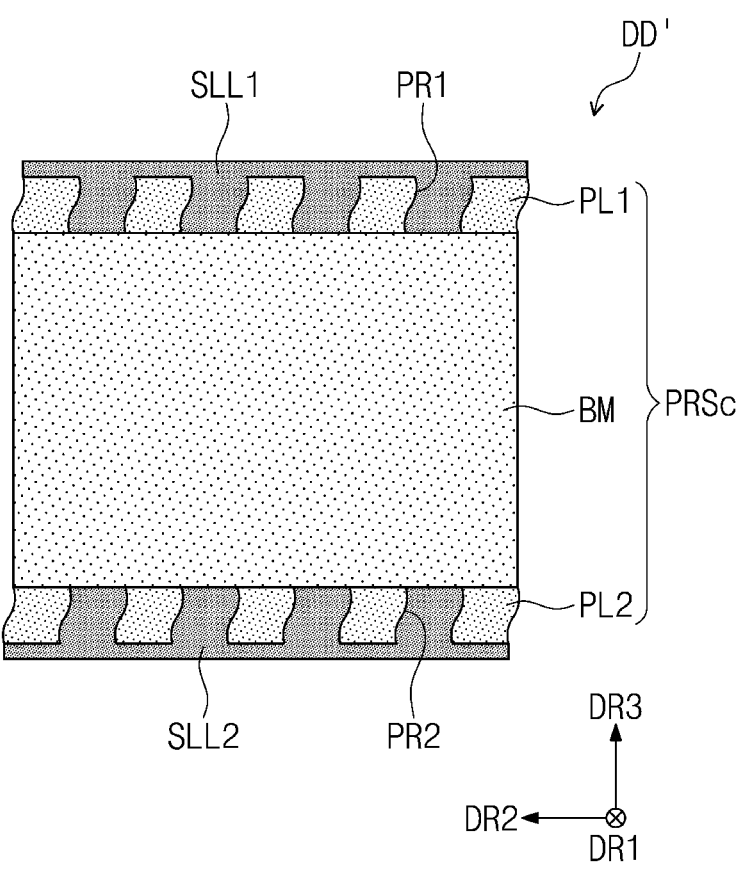
FIG. 18B is an enlarged sectional view of region DD' of FIG. 18A.

FIG. 18A is a sectional view of a support plate according to yet another embodiment of the present disclosure. FIG. 18B is an enlarged sectional view of region DD' of FIG. 18A. Components identical or similar to the components described with reference to FIGS. 1 to 15 will be assigned with identical or similar reference numerals, and repetitive descriptions will be omitted.

Referring to FIGS. 18A and 18B, in this embodiment, the support plate SPT-6 may include a porous substrate PRSc, a first sealing layer SLL1, and a second sealing layer SLL2. The first sealing layer SLL1 and the second sealing layer SLL2 may be spaced apart from each other in the thickness direction (that is, the third direction DR3) with the porous substrate PRSc therebetween.

The first sealing layer SLL1 may be disposed on the porous substrate PRSc. As illustrated in FIG. 18B, the first sealing layer SLL1 may be attached to a first porous film PL1 inside the porous substrate PRSc. The first sealing layer SLL1 may cover the first porous film PL1. The first sealing layer SLL1 may fill first pores PR1 of the first porous film PL1 and may cover the first porous film PL1.

The second sealing layer SLL2 may be disposed under the porous substrate PRSc. As illustrated in FIG. 18B, the second sealing layer SLL2 may be attached to a second porous film PL2 inside the porous substrate PRSc. The second sealing layer SLL2 may cover the second porous film PL2. The second sealing layer SLL2 may fill second pores PR2 of the second porous film PL2 and may cover the second porous film PL2.

Although FIG. 18B illustrates an embodiment in which the porous substrate PRSc includes a base material BM and the first and second porous films PL1 and PL2, the porous substrate PRSc may include the base material BM and the first to fourth porous films PL1 to PL4 as described above with reference to FIG. 12A. In this case, the first sealing layer SLL1 may fill some of the third pores PR3 (refer to FIG. 12A) exposed from the first porous film PL1, and the second sealing layer SLL2 may fill some of the fourth pores PR4 (refer to FIG. 12A) exposed from the second porous film PL2.

According to this embodiment, the first and second sealing layers SLL1 and SLL2 may be attached to the porous substrate PRSc. When the support plate SPT-6 is folded in an in-folding manner, the first sealing layer SLL1 may prevent damage to a portion where compressive stress is dominant, and the second sealing layer SLL2 may prevent damage to a portion where tensile stress is dominant. Accordingly, a portion of the porous substrate PRSc that overlaps the folding region FA may not define openings or grooves therein. A third support part SA3 may overlap the entirety of the folding region FA. Thus, a process of forming openings or grooves in the support plate SPT-6 may be omitted. As a result, a manufacturing process may be simplified, manufacturing costs may be reduced, and the degree of freedom in selection of a material may be improved.

In addition, because the support plate SPT-6 does not define openings therein, the cover layer CVL (refer to FIG. 6) attached to the support plate SPT-6 to prevent infiltration of foreign matter may be omitted.

Figure 19A:
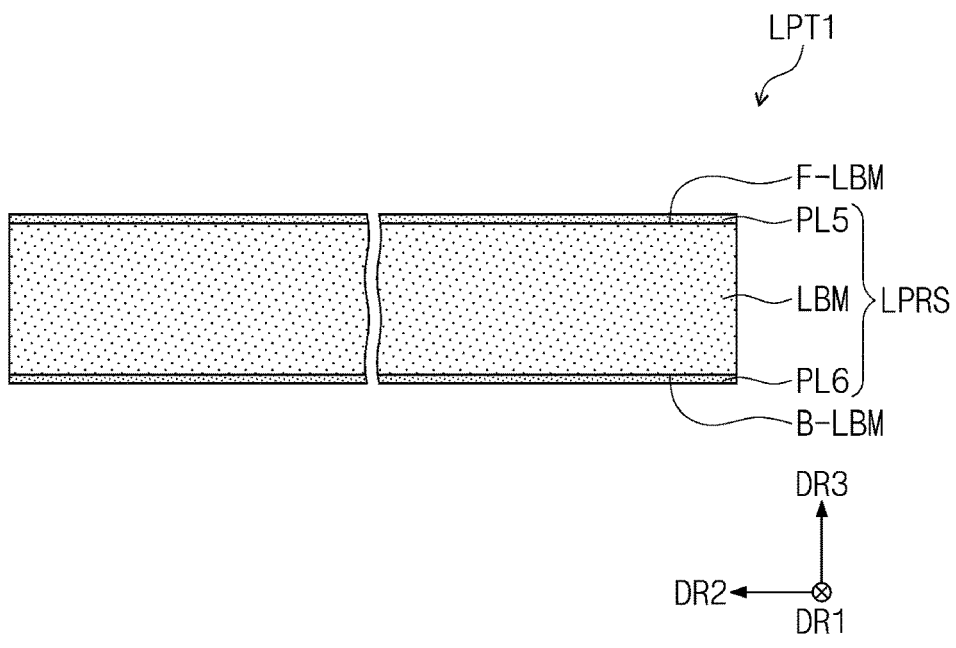
FIGS. 19A and 19B are sectional views illustrating a part of a lower plate according to embodiments of the present disclosure.
Figure 19B:
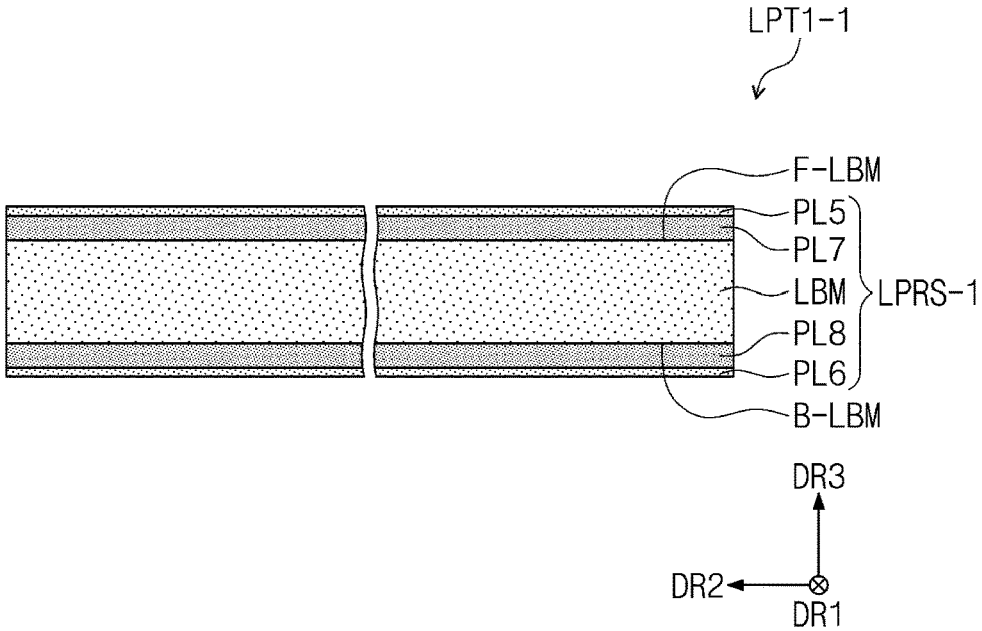
Figure 20A:
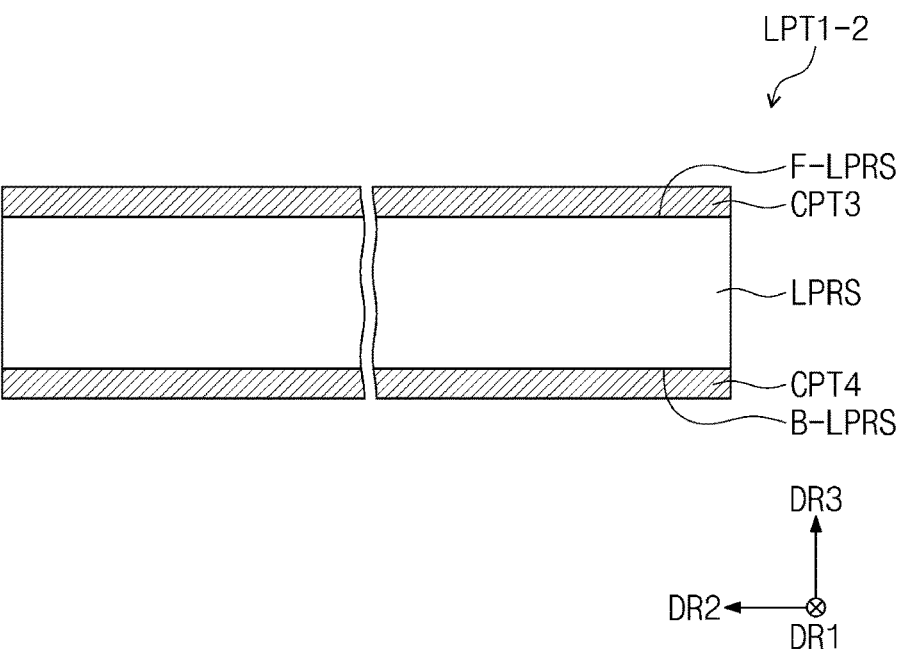
FIGS. 20A and 20B are sectional views illustrating a part of a lower plate according to embodiments of the present disclosure.
Figure 20B:
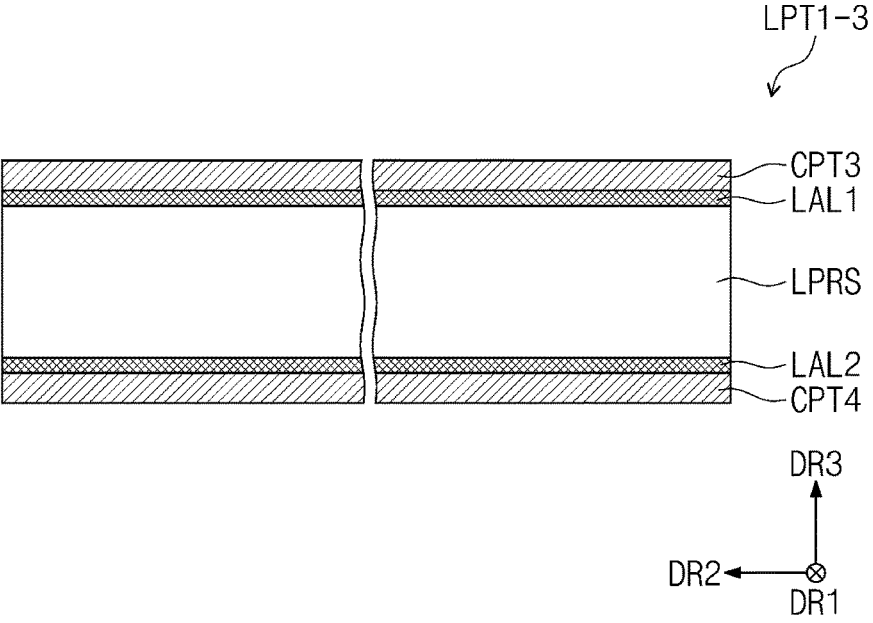

FIGS. 19A and 19B are sectional views illustrating a part of the lower plate according to embodiments of the present disclosure. FIGS. 20A and 20B are sectional views illustrating a part of the lower plate according to embodiments of the present disclosure. In FIGS. 19A to 20B, only first lower plates LPT1, LPT1-1, LPT1-2, and LPT1-3 are illustrated as examples. Descriptions of the first lower plates LPT1, LPT1-1, LPT1-2, and LPT1-3 given below with reference to FIGS. 19A to 20B may be identically applied to the second lower plate LPT2 (refer to FIG. 6). Components identical or similar to the components described with reference to FIGS. 1 to 15 will be assigned with identical or similar reference numerals, and repetitive descriptions will be omitted.

Referring to FIG. 19A, in this embodiment, the first lower plate LPT1 may include a lower porous substrate LPRS. The lower porous substrate LPRS may include a lower base material LBM, a fifth porous film PL5, and a sixth porous film PL6. The fifth porous film PL5 and the sixth porous film PL6 may be spaced apart from each other in the thickness direction (that is, the third direction DR3) with the lower base material LBM therebetween.

The lower base material LBM may be a metallic base material. The fifth porous film PL5 may be an oxide film formed on a front surface F-LBM of the lower base material LBM, and the sixth porous film PL6 may be an oxide film formed on a rear surface B-LBM of the lower base material LBM. In this embodiment, the description of the base material BM given above with reference to FIGS. 10A to 11C may be similarly applied to the lower base material LBM, and the description of the first porous film PL1 and the second porous film PL2 given above with reference to FIGS. 10A to 11C may be similarly applied to the fifth porous film PL5 and the sixth porous film PL6. That is, the fifth porous film PL5 and the sixth porous film PL6 may be formed by anodizing the lower base material LBM. Each of the fifth porous film PL5 and the sixth porous film PL6 may define pores therein.

According to this embodiment, the impact resistance of the lower plate LPT (refer to FIG. 6) to an external impact may be improved, and damage to the display device DD (refer to FIG. 6) due to the external impact may be reduced or prevented. The elastic resilience of the lower plate LPT (refer to FIG. 6) may be improved, and deformation of the display device DD (refer to FIG. 6) may be reduced or prevented accordingly. The lower plate LPT (refer to FIG. 6) may have high shear stress and improved impact resistance, and the reliability of the lower plate LPT (refer to FIG. 6) may be effectively improved. In addition, the lower base material LBM may include a light metal. Accordingly, the lower plate LPT (refer to FIG. 6) may be made light in weight.

In an embodiment, the first lower plate LPT1 may further include sealing agents filling the pores in the fifth porous film PL5 and sealing agents filling the pores in the sixth porous film PL6. In an embodiment of the present disclosure, the first lower plate LPT1 may further include a sealing layer that fills the pores in the fifth porous film PL5 and covers the fifth porous film PL5 and a sealing layer that fills the pores in the sixth porous film PL6 and covers the sixth porous film PL6.

Referring to FIG. 19B, in this embodiment, the first lower plate LPT1-1 may include a lower porous substrate LPRS-1. The lower porous substrate LPRS-1 may include a lower base material LBM, a fifth porous film PL5, a sixth porous film PL6, a seventh porous film PL7, and an eighth porous film PL8.

The fifth porous film PL5 and the seventh porous film PL7 may be disposed on the lower base material LBM, and the sixth porous film PL6 and the eighth porous film PL8 may be disposed under the lower base material LBM. The seventh porous film PL7 may be disposed between the lower base material LBM and the fifth porous film PL5, and the eighth porous film PL8 may be disposed between the lower base material LBM and the sixth porous film PL6.

In this embodiment, the description of the base material BM given above with reference to FIGS. 12A to 13C may be similarly applied to the lower base material LBM, and the description of the first to fourth porous films PL1 to PL4 given above with reference to FIGS. 12A to 13C may be similarly applied to the fifth to eighth porous films PL5 to PL8. That is, the fifth to eighth porous films PL5 to PL8 may be formed through plasma electrolytic oxidation of the lower base material LBM. Each of the fifth to eighth porous films PL5 to PL8 may define pores therein. The seventh and eighth porous films PL7 and PL8 may have a lower porosity, a higher density, and a higher hardness than the fifth and sixth porous films PL5 and PL6, respectively.

According to this embodiment, the lower porous substrate LPRS-1 may include the high-density films PL7 and PL8, and thus an adhesion force between the lower base material LBM and the low-density films PL5 and PL6 may be effectively improved. The high-density films PL7 and PL8 may provide films having relatively high hardness between the lower base material LBM and the low-density films PL5 and PL6 while providing spaces for impact dispersion between the lower base material LBM and the low-density films PL5 and PL6, thereby reducing or preventing damage to the porous films PL5 to PL8 due to an external impact.

In an embodiment of the present disclosure, the first lower plate LPT1-1 may further include sealing agents filling the pores in the fifth porous film PL5 and sealing agents filling the pores in the sixth porous film PL6.

Referring to FIG. 20A, in this embodiment, the first lower plate LPT1-2 may include a lower porous substrate LPRS, a third cover substrate CPT3, and a fourth cover substrate CPT4. When compared to those in the embodiments described with reference to FIGS. 19A and 19B, the first lower plate LPT1-2 may further include the third cover substrate CPT3 and the fourth cover substrate CPT4. The third cover substrate CPT3 and the fourth cover substrate CPT4 may be spaced apart from each other in the thickness direction (that is, the third direction DR3) with the lower porous substrate LPRS therebetween.

In FIG. 20A, the lower porous substrate LPRS is briefly illustrated. The description given above with reference to FIG. 19A may be applied to the lower porous substrate LPRS. The lower porous substrate LPRS may include a lower base material LBM and fifth and sixth porous films PL5 and PL6. Alternatively, the description given above with reference to FIG. 19B may be applied to the lower porous substrate LPRS. The lower porous substrate LPRS may include a lower base material LBM and fifth to eighth porous films PL5 to PL8.

The third cover substrate CPT3 may be disposed on the lower porous substrate LPRS. The third cover substrate CPT3 may be directly disposed on a front surface F-LPRS of the lower porous substrate LPRS. The fourth cover substrate CPT4 may be disposed under the lower porous substrate LPRS. The fourth cover substrate CPT4 may be directly disposed on a rear surface B-LPRS of the lower porous substrate LPRS.

Each of the third cover substrate CPT3 and the fourth cover substrate CPT4 may include a metal. Each of the third cover substrate CPT3 and the fourth cover substrate CPT4 may be a metal substrate. In an embodiment, the metal included in each of the third cover substrate CPT3 and the fourth cover substrate CPT4 may include stainless steel (SUS). The cover substrates CPT3 and CPT4 may be disposed on the porous films defining pores formed therein, and thus damage to the porous films may be reduced or prevented. Accordingly, the reliability of the lower plate LPT (refer to FIG. 6) may be effectively improved.

Referring to FIG. 20B, in this embodiment, the first lower plate LPT1-3 may include a lower porous substrate LPRS, a third cover substrate CPT3, a fourth cover substrate CPT4, a first lower adhesive layer LAL1, and a second lower adhesive layer LAL2. That is, when compared to that in the embodiment described with reference to FIG. 20A, the first lower plate LPT1-3 may further include the first lower adhesive layer LAL1 and the second lower adhesive layer LAL2.

The first lower adhesive layer LAL1 may be disposed between the lower porous substrate LPRS and the third cover substrate CPT3. The first lower adhesive layer LAL1 may couple the lower porous substrate LPRS and the third cover substrate CPT3. The second lower adhesive layer LAL2 may be disposed between the lower porous substrate LPRS and the fourth cover substrate CPT4. The second lower adhesive layer LAL2 may couple the lower porous substrate LPRS and the fourth cover substrate CPT4.

Each of the first lower adhesive layer LAL1 and the second lower adhesive layer LAL2 may include a transparent adhesive such as a pressure sensitive adhesive (PSA) or an optically clear adhesive (OCA), but is not limited thereto. For another example, each of the first lower adhesive layer LAL1 and the second lower adhesive layer LAL2 may include thermoplastic polyurethane (TPU).

According to this embodiment, even though folding and unfolding operations of the electronic device ED (refer to FIG. 1) are repeated, the coupled state of the lower porous substrate LPRS and the cover substrates CPT3 and CPT4 may be stably maintained, and damage or deformation of the lower plate LPT (refer to FIG. 6) may be reduced or prevented. Accordingly, the reliability of the lower plate LPT (refer to FIG. 6) may be effectively improved.

According to the present disclosure, the electronic device may include the support plate having high shear stress and improved impact resistance and elastic resilience. Accordingly, damage to the electronic device due to an external impact may be reduced or prevented, and damage or deformation of the electronic device due to repeated folding operations may be reduced or prevented. Thus, the reliability of the electronic device may be effectively improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a display panel foldable about a virtual folding axis extending in a first direction; and
a support plate disposed under the display panel, the support plate including a porous substrate,
wherein the porous substrate includes:
a base material including a metal;
a first porous film disposed on the base material, the first porous film including metal oxide; and
a second porous film disposed under the base material, the second porous film including metal oxide.

2. The electronic device of claim 1, wherein each of the metal oxide included in the first porous film and the metal oxide included in the second porous film is oxide of the metal included in the base material.

3. The electronic device of claim 1, wherein each of pores in the first porous film and pores in the second porous film has a pillar shape extending in a thickness direction in a sectional view.

4. The electronic device of claim 1, wherein the porous substrate further includes:
a third porous film disposed between the base material and the first porous film; and
a fourth porous film disposed between the base material and the second porous film,
wherein the third porous film has a lower porosity than the first porous film, and
wherein the fourth porous film has a lower porosity than the second porous film.

5. The electronic device of claim 4, wherein the third porous film has a higher hardness than the first porous film, and
wherein the fourth porous film has a higher hardness than the second porous film.

6. The electronic device of claim 4, wherein each of the metal oxide included in the first porous film and the metal oxide included in the second porous film is oxide of the metal included in the base material, and
wherein each of the third porous film and the fourth porous film includes oxide of the metal included in the base material.

7. The electronic device of claim 4, wherein each of pores in the first porous film, pores in the second porous film, pores in the third porous film, and pores in the fourth porous film has a pillar shape extending in a thickness direction in a sectional view.

8. The electronic device of claim 1, wherein the metal included in the base material includes one of aluminum, magnesium, and titanium.

9. The electronic device of claim 1, wherein the support plate further includes:
first sealing agents filling pores in the first porous film; and
second sealing agents filling pores in the second porous film.

10. The electronic device of claim 9, wherein each of the first sealing agents and the second sealing agents includes one of a dye and an elastic material.

11. The electronic device of claim 1, wherein the support plate further includes:
a first cover substrate disposed on the first porous film; and a second cover substrate disposed under the second porous film, and
wherein each of the first cover substrate and the second cover substrate includes a metal.

12. The electronic device of claim 11, wherein each of the first cover substrate and the second cover substrate includes stainless steel (SUS).

13. The electronic device of claim 11, wherein the support plate further includes:
a first adhesive support layer disposed between the first cover substrate and the first porous film; and
a second adhesive support layer disposed between the second cover substrate and the second porous film.

14. The electronic device of claim 1, wherein the display panel includes a folding region foldable about the folding axis and a first non-folding region and a second non-folding region spaced apart from each other in a second direction crossing the first direction with the folding region therebetween.

15. The electronic device of claim 14, wherein the support plate includes a first support part configured to overlap the first non-folding region, a second support part configured to overlap the second non-folding region, and a third support part configured to overlap the folding region, and
wherein the third support part defines openings penetrating the support plate from a front surface of the support plate to a rear surface of the support plate.

16. The electronic device of claim 15, wherein the openings are arranged in a grid form in a plan view.

17. The electronic device of claim 14, wherein the support plate includes a first support part configured to overlap the first non-folding region, a second support part configured to overlap the second non-folding region, and a third support part configured to overlap the folding region, and
wherein the third support part defines grooves on a rear surface of the support plate.

18. The electronic device of claim 14, wherein the support plate further includes a filling member including an elastic material,
wherein the porous substrate is provided in plurality, and the plurality of porous substrates include a first plate configured to overlap the first non-folding region and a second plate configured to overlap the second non-folding region and spaced apart from the first plate, and
wherein the filling member overlaps the folding region and is disposed between the first plate and the second plate.

19. The electronic device of claim 14, wherein the support plate further includes:
a first sealing layer disposed on the first porous film and covering the first porous film; and
a second sealing layer disposed under the second porous film and covering the second porous film, and
wherein each of the first sealing layer and the second sealing layer includes an elastic material.

20. The electronic device of claim 19, wherein the support plate includes a first support part configured to overlap the first non-folding region, a second support part configured to overlap the second non-folding region, and a third support part configured to overlap the folding region, and
wherein the third support part overlaps an entirety of the folding region.

21. The electronic device of claim 16, further comprising:
a first lower plate disposed under the support plate and configured to overlap the first non-folding region and one portion of the folding region; and a second lower plate disposed under the support plate and configured to overlap the second non-folding region and another portion of the folding region, the second lower plate being spaced apart from the first lower plate, wherein each of the first lower plate and the second lower plate includes:

a lower base material including a metal;

a fifth porous film disposed on the lower base material, the fifth porous film including metal oxide; and a sixth porous film disposed under the lower base material, the sixth porous film including metal oxide.

22. The electronic device of claim 21, wherein each of the first lower plate and the second lower plate further includes:

a seventh porous film disposed between the lower base material and the fifth porous film; and an eighth porous film disposed between the lower base material and the sixth porous film.

23. The electronic device of claim 22, wherein the seventh porous film has a higher hardness than the fifth porous film, and wherein the eighth porous film has a higher hardness than the sixth porous film.

24. The electronic device of claim 21, wherein each of the first lower plate and the second lower plate further includes:

a third cover substrate disposed on the fifth porous film; and a fourth cover substrate disposed under the sixth porous film, and wherein each of the third cover substrate and the fourth cover substrate includes a metal.

25. The electronic device of claim 24, wherein each of the first lower plate and the second lower plate further includes:

a first lower adhesive layer disposed between the third cover substrate and the fifth porous film; and a second lower adhesive layer disposed between the fourth cover substrate and the sixth porous film.

26. The electronic device of claim 1, further comprising:

an electronic module disposed under the display panel and at least partially inserted into a hole defined in the support plate.

27. An electronic device comprising:

a display panel foldable about a virtual folding axis; and a support plate disposed under the display panel, the support plate including a porous substrate, wherein the porous substrate includes:

a base material including a metal;

a first oxide film disposed on the base material, the first oxide film defining first pores therein; and a second oxide film disposed under the base material, the second oxide film defining second pores therein.

28. The electronic device of claim 27, wherein the porous substrate further includes:

a third oxide film disposed between the base material and the first oxide film, the third oxide film defining third pores therein; and a fourth oxide film disposed between the base material and the second oxide film, the fourth oxide film defining fourth pores therein, wherein the third oxide film has a lower porosity than the first oxide film, and wherein the fourth oxide film has a lower porosity than the second oxide film.

29. A method of manufacturing an electronic device comprising:

forming a support plate under a display panel foldable about a virtual folding axis extending in a first direction, wherein the forming the support plate comprises:

forming a first porous film and a second porous film including metal oxide, wherein in the forming the first porous film and the second porous film, the first porous film is formed on a base material and the second porous film is formed under the base material.

30. The method of manufacturing the electronic device of claim 29, wherein the forming the first porous film and the second porous film is performed through an anodizing process.

31. The method of manufacturing the electronic device of claim 29, wherein in the forming the first porous film and the second porous film, a third porous film is further formed between the base material and the first porous film, and a fourth porous film is further formed between the base material and the second porous film.

32. The method of manufacturing the electronic device of claim 31, wherein the forming the first porous film and the second porous film is performed through a plasma electrolytic oxidation process.

* * * * *